United States Patent
Pankanti et al.

(10) Patent No.: US 10,803,535 B2
(45) Date of Patent: Oct. 13, 2020

(54) FACILITATING POWER TRANSACTIONS

(71) Applicant: International Business Machines Corporation, Armonk, NY (US)

(72) Inventors: Sharathchandra Umapathirao Pankanti, Darien, CT (US); Erik Rueger, Ockenheim (DE); Rolf Schaefer, Mainz (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

(21) Appl. No.: 15/492,145

(22) Filed: Apr. 20, 2017

(65) Prior Publication Data
US 2018/0308183 A1   Oct. 25, 2018

(51) Int. Cl.
| | | |
|---|---|---|
| *G06Q 40/00* | (2012.01) | |
| *G06Q 50/06* | (2012.01) | |
| *G06Q 40/08* | (2012.01) | |
| *G06N 20/00* | (2019.01) | |
| *G06N 3/00* | (2006.01) | |

(52) U.S. Cl.
CPC ............. *G06Q 50/06* (2013.01); *G06Q 40/08* (2013.01); *G06N 3/006* (2013.01); *G06N 20/00* (2019.01)

(58) Field of Classification Search
CPC ............... G06Q 30/02; G06Q 30/0224; G06Q 30/0601; G06Q 30/08; G06Q 50/188
See application file for complete search history.

(56) References Cited

U.S. PATENT DOCUMENTS

| | | | |
|---|---|---|---|
| 6,842,899 B2 | 1/2005 | Moody et al. | |
| 8,401,708 B2 | 3/2013 | Nagata et al. | |
| 9,188,109 B2* | 11/2015 | Lazaris | G06Q 30/0605 |
| 10,073,426 B1 | 9/2018 | Davis, II | |
| 2002/0046157 A1* | 4/2002 | Solomon | G06Q 30/02 |
| | | | 705/37 |

(Continued)

FOREIGN PATENT DOCUMENTS

| | | |
|---|---|---|
| WO | 03067494 A1 | 8/2003 |
| WO | 2003067494 A1 | 8/2003 |

OTHER PUBLICATIONS

Gotham, Douglas (Energy Forecasting Methods, https://www.purdue.edu/discoverypark/energy/assets/pdfs/SUFG/SUFG-ForecastingMethods.pdf, Nov. 2007) (Year: 2007).*

(Continued)

*Primary Examiner* — Sarah M Monfeldt
*Assistant Examiner* — Mark H Gaw
(74) *Attorney, Agent, or Firm* — Amin, Turocy & Watson, LLP

(57) ABSTRACT

The subject invention relates to employing interactive components and execution components to facilitate power transactions. In an example, a method includes receiving a first set of data from a set of agent components, wherein the first set of data represents a purchase, a transmission, a production, a sale or a consumption of energy; and facilitating execution, by the system, of a set of contracts between a first subset of agent components and a second subset of agent components based on the first set of data. In another example, a method can further include insuring, by the system, the set of contracts against a supply surplus of energy or a production shortage of energy.

11 Claims, 15 Drawing Sheets

(56) References Cited

U.S. PATENT DOCUMENTS

| | | | |
|---|---|---|---|
| 2003/0110118 A1* | 6/2003 | Tilfors | G06Q 30/06 705/37 |
| 2004/0139034 A1* | 7/2004 | Farmer | G06Q 30/0283 705/400 |
| 2006/0036530 A1* | 2/2006 | Shkedy | G06Q 20/382 705/37 |
| 2006/0206240 A1* | 9/2006 | Tsui | H02J 3/008 700/291 |
| 2009/0043520 A1 | 2/2009 | Pollack et al. | |
| 2010/0217550 A1 | 8/2010 | Crabtree et al. | |
| 2012/0136496 A1 | 5/2012 | Black et al. | |
| 2013/0159157 A1 | 6/2013 | Greene et al. | |
| 2013/0217409 A1 | 8/2013 | Bridges et al. | |
| 2014/0222698 A1* | 8/2014 | Potdar | G06Q 30/018 705/317 |
| 2015/0025696 A1 | 1/2015 | Hug et al. | |
| 2015/0046221 A1* | 2/2015 | Narayan | G06Q 50/06 705/7.31 |
| 2015/0105924 A1 | 4/2015 | Lazaris | |

OTHER PUBLICATIONS

Mel, et al., "The NIST Definition of Cloud Computing," NIST Special Publication 800-145, Sep. 2011, 7 pages.

List of IBM Patents and Applications treated as related.

Non-Final Office Action received for U.S. Appl. No. 15/842,671 dated Mar. 29, 2019, 23 pages.

Non-Final Office Action received for U.S. Appl. No. 15/842,671 dated Oct. 2, 2019, 26 pages.

Michael Copeland, What's the difference between artifical intelligence, machine learning and deep learning, Jul. 29, 2016, pp. 2, 4, 5, 7 @https:I/blogs.nvidia.com/blog/20 16/07 /29/whats-difference-artificial-intelligence-rnachine-learni ng deep-learni ng-ai (Year: 2016).

Non-Final Office Action received for U.S. Appl. No. 15/842,671 dated Feb. 21, 2020, 52 pages.

Tellen, "Even with a lull, there is enough electricity," Handelsblatt, Combined power plants, Published Sep. 19, 2012, 14 pages (with English translation).

youtube.com, "Made in IBM Labs: Swiss Smart Grid Pilot Announced," Published Oct. 24, 2012, https://www.youtube.com/watch?v=BU8y6pQBQIc&feature=youtu.be, 2 pages.

youtube.com, "T&D 2012 the Future of Smart Grid: Technology, Policy, Standards & Consumer Behavior (Video 5 of 5)," Published on Jun. 5, 2012, https://www.youtube.com/watch?v=h0CrQ_hZV6A, 2 pages.

* cited by examiner

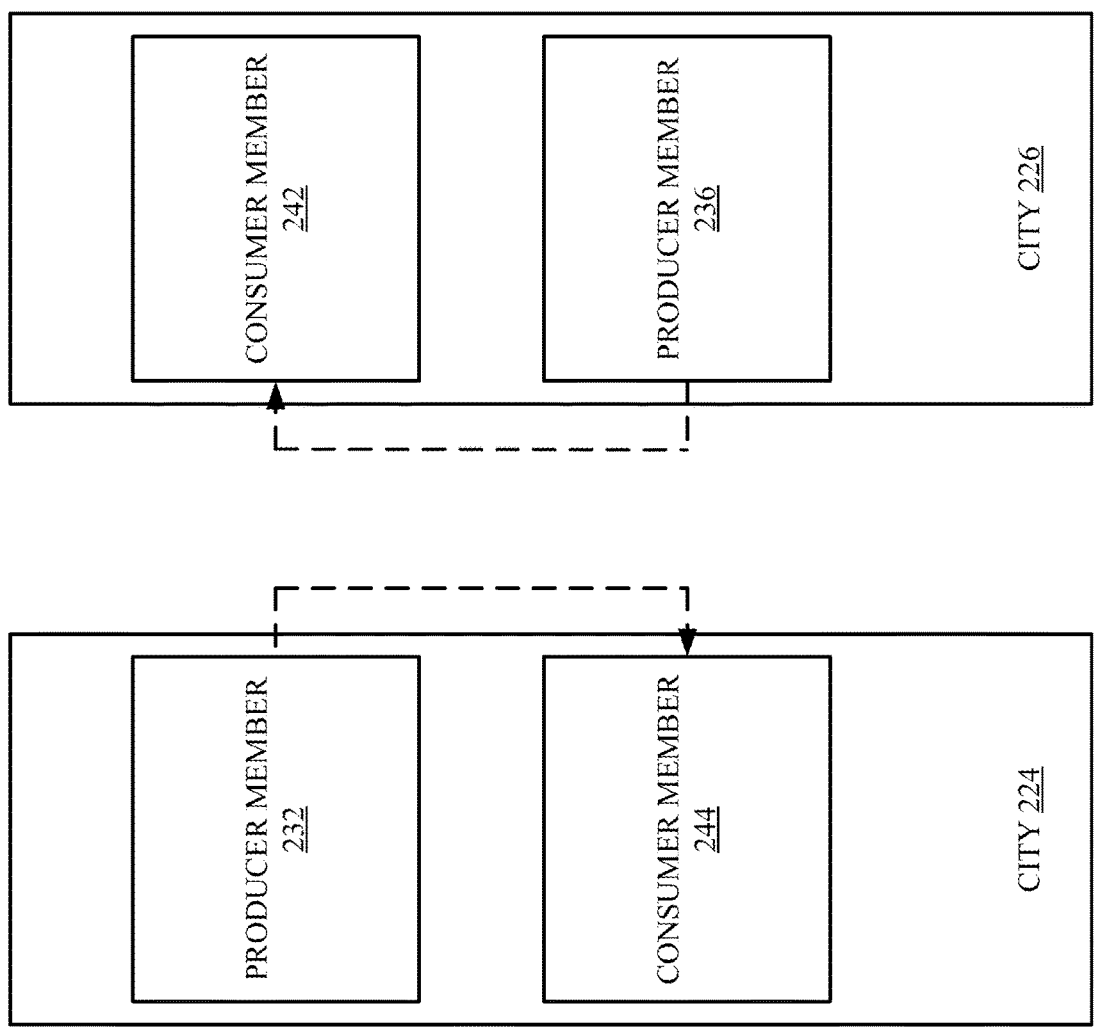

300

302 — RECEIVING, BY A SYSTEM OPERATIVELY COUPLED TO A PROCESSOR, A FIRST SET OF DATA FROM A SET OF AGENT COMPONENTS, WHEREIN THE SET OF DATA REPRESENTS A PURCHASE, A TRANSMISSION, A PRODUCTION, A SALE, AND A CONSUMPTION OF ENERGY.

304 — FACILITATING EXECUTION, BY THE SYSTEM, OF A SET OF CONTRACTS BETWEEN AT LEAST A SUBSET OF AGENT COMPONENTS.

FACILITATING POWER TRANSACTIONS

BACKGROUND

The present invention relates to employing interactive components and execution components to facilitate power transactions. The interactive components can facilitate a transmission of power transaction data between agent components of a system. The transmitted data can represent information associated with energy production, consumption, or transportation. The execution components can facilitate an execution of contracts based on at least some of the transmitted data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that facilitate an interaction between a set of agent components and execution of contracts between a subset of agent components.

According to an embodiment, a system is provided. The system comprises a processor that executes computer executable components stored in memory. The computer executable components include an interaction component that receives first information from a set of agent components regarding purchase, generation, sale or provisioning of energy by one or more devices. Further, the computer executable components include an execution component that facilitates execution of contracts between a subset of the set of agent components based on the first information.

According to another embodiment, a computer-implemented method is provided. The computer-implemented method can comprise receiving, by a system comprising a processor, a first set of data from a set of agent components, wherein the set of data represents a purchase, a transmission, a production, a sale or a consumption of energy. The computer-implemented method can also comprise facilitating execution, by the system, of a set of contracts between a first subset of the agent components based on the first set of data.

According to yet another embodiment, a computer program product is provided. The computer program product comprises a computer readable storage medium having program instructions embodied therewith, the program instructions executable by a processor to cause the processor to: receive a first set of data from a group of agent components, wherein the group of agent components comprises at least one of a consumer agent component, a producer agent component, a grid agent component or an insurance agent component; and facilitate execution of a set of contracts between at least a portion of the group of agent components based on the first set of data.

BRIEF DESCRIPTION OF THE DRAWINGS

FIG. 2D illustrates a block diagram of an example, non-limiting physical flow of electricity between one or more energy producers and/or one or more energy consumers located in one or more cities in accordance with one or more embodiments described herein.

DETAILED DESCRIPTION

Figure 1A:
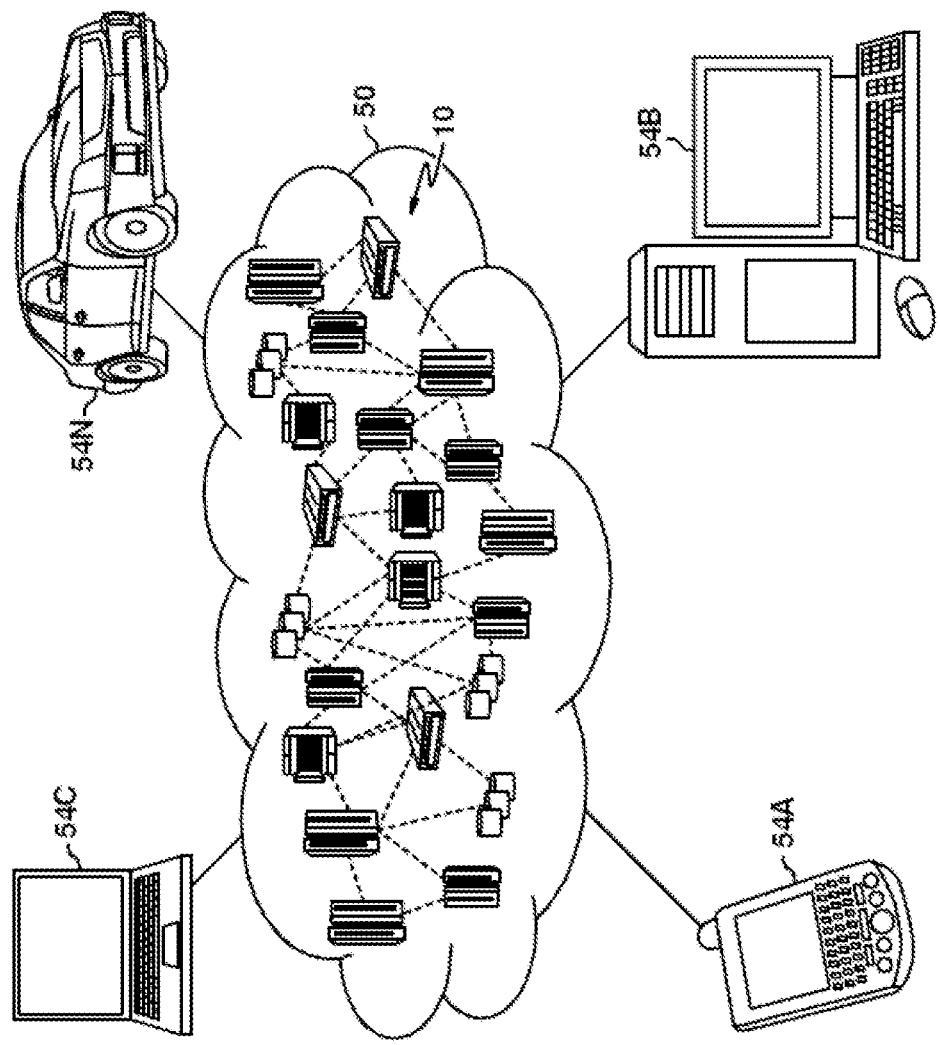
FIG. 1A depicts a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service model, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDA's).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy into the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The subject disclosure is directed to employing interactive components and execution components to facilitate power transactions. In an aspect, the interactive components can provide a cloud-based marketplace to accommodate one or more member devices or one or more member agent components operating on member devices or agent devices to exchange information and execute transactions related to the purchase, sale, and transportation of energy.

Referring now to FIG. 1A, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1A are intended to be illustrative only and that computing nodes 10 and cloud computing environment 50 can communicate with any type of computerized device over any type of network and/or network addressable connection (e.g., using a web browser).

Figure 1B:
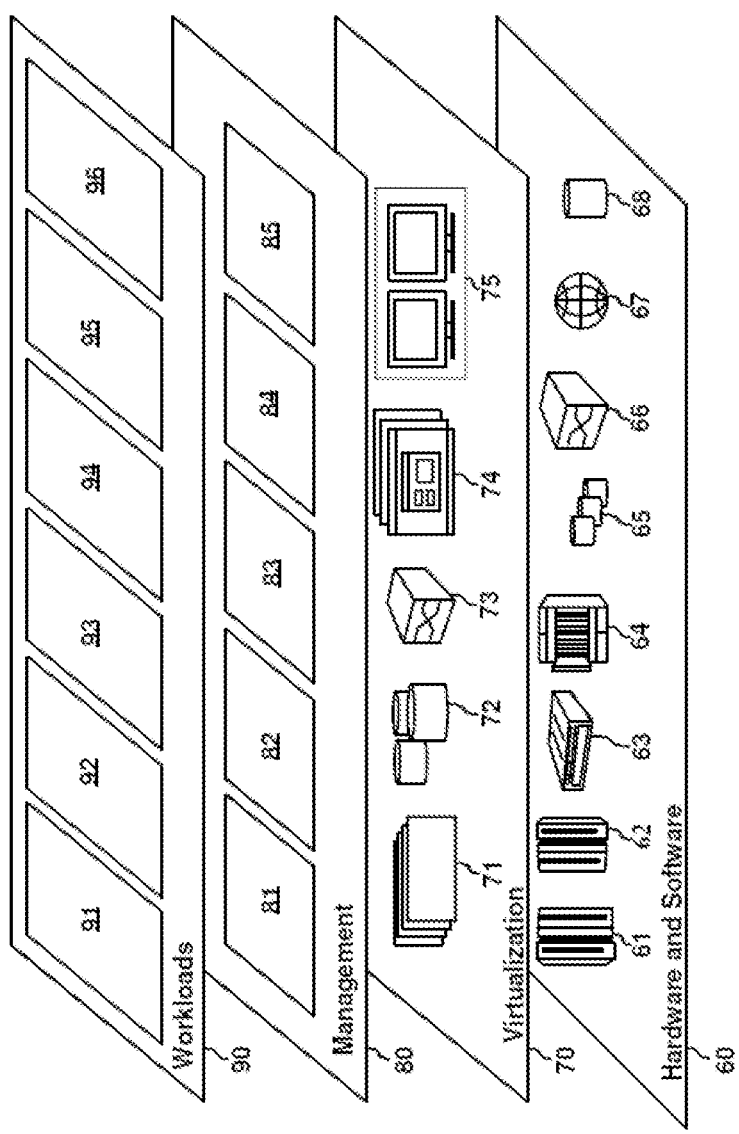
FIG. 1B depicts abstraction model layers in accordance with one or more embodiments described herein.

Referring now to FIG. 1B, a set of functional abstraction layers provided by cloud computing environment 50 is shown. Repetitive description of like elements employed in other embodiments described herein is omitted for sake of brevity. It should be understood in advance that the components, layers, and functions shown in FIG. 1B are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alert event tracking and predicting 96. Various embodiments of the present invention can utilize the cloud computing environment described with reference to FIGS. 1A and 1B to facilitate tracking and/or predicting one or more alert events.

Figure 1C:
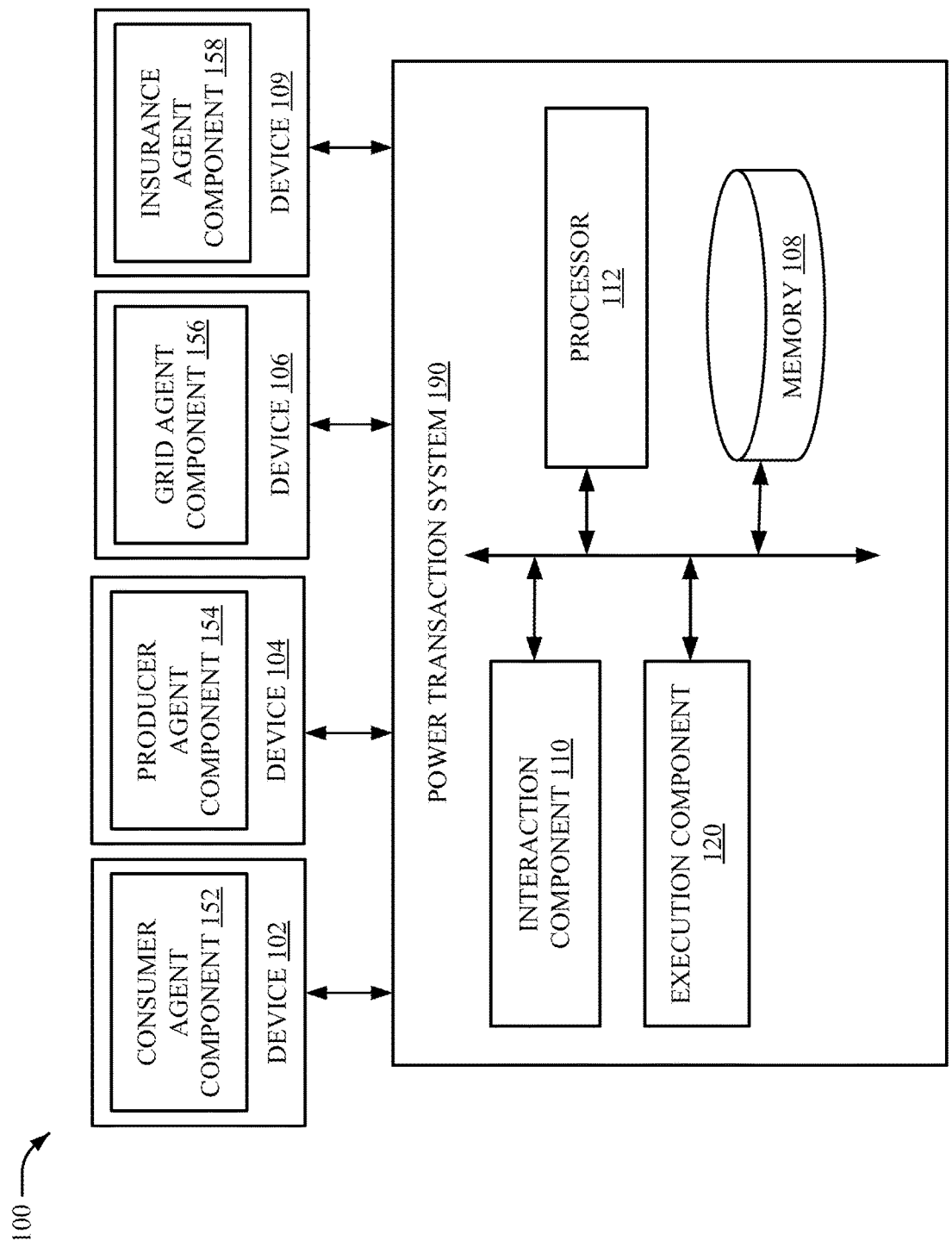
FIG. 1C illustrates a block diagram of an example, non-limiting system that can facilitate an interaction between a set of agent components to facilitate one or more power transactions in accordance with one or more embodiments described herein.

FIG. 1C illustrates a block diagram of an example, non-limiting system 100 that can facilitate an interaction between a set of agent components to facilitate one or more power transactions in accordance with one or more embodiments described herein. For example, a device 102 can employ consumer agent component 152 to interact with device 104 that can employ a producer agent component 154, device 106 that can employ a grid agent component 156, and/or device 109 that can employ insurance agent component 158 to facilitate a power transaction comprising the purchase, generation, sale, and/or provisioning of energy. Accordingly, FIG. 1C illustrates a block diagram of an example, non-limiting embodiment of system 100 that can facilitate an interaction between a set of agent components to communicate information regarding a purchase, generation, sale and/or provisioning of energy in accordance with one or more embodiments described herein.

Aspects of systems (e.g., system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein.

As shown in FIG. 1C, illustrated is a system 100 that can comprise power transaction system 190 comprising an interaction component 110 and an execution component 120. The power transaction system 190 can also include or otherwise be associated with one or more processors (e.g., such as processor 112) that can execute the computer executable components and/or computer instructions stored in memory 108. In an aspect, system 100 can also comprise consumer agent component 152 operating on device 102, producer agent component 154 operating on device 104, grid agent component 156 operating on device 106, and insurance agent component 158 operating on device 109. In an aspect, one or more of the components of system 100 can be electrically and/or communicatively coupled to one or more devices of system 100 or other embodiments disclosed herein.

In an aspect, the interaction component 110 can receive first information from a set of agent components (e.g., consumer agent component 152, producer agent component 154, grid agent component 156, insurance agent component 158) regarding purchase, generation, sale and/or provisioning of energy. In an aspect, one or more agent components can represent an entity or individual referred to as a member that performs a transactional activity associated with energy (e.g., energy producer, consumer, insurer, transporter).

In some embodiments, the goal of one or more agent components, operating on a device on behalf of a member, can be to facilitate an execution of contracts, on behalf of a member, obligating or entitling the member to perform a desired energy activity. In an aspect, a member can be a consumer member, a producer member, a grid member, or an insurance member. The members can be represented by a consumer agent component 152, a producer agent component 154, a grid agent component 156, or an insurance agent component 158. The producer member (represented by producer agent component 154) can be any individual or entity that generates electricity. In some embodiments, the goal of the producer member can be to generate maximum income (or a defined amount of income or to increase income relative to a previous income). The consumer member can be any individual or entity that consumes energy. In some embodiments, the goal of the consumer member can be to purchase energy.

An agent component can interact (e.g., using interaction component 110) with other agent components in a virtual trading room (e.g. comprising software components including interaction component 110 and/or execution component 120) stored on one or more servers to negotiate and/or execute contracts. In an aspect, the agent components (e.g., set of agent components), interacting with other agent components can facilitate the building of contracts with one another. For instance, a contract can include terms informed by information exchanged between one or more agent components. A contract term can be generated based on the participation or interaction (e.g., using interaction component 110) between a consumer agent component 152, producer agent component 154, grid agent component 156, and/or an insurance agent component 158. The consumer agent component 152 can negotiate an amount of electrical energy during a specified time period for purchase by a consumer member of system 100. In an aspect, the producer agent component 154 can negotiate (e.g., by proposing a contract term, proposing an alteration to a contract term, exchanging information or exchanging data supporting a particular proposal, etc.) an amount of electrical energy during a specified time period to sell by a producer member of system 100.

In another aspect, the grid agent component 156 can negotiate terms regarding transportation of electricity through an electric grid and/or based on an estimated capacity of the grid at a given time and/or date by a grid member of system 100. In yet another aspect, an insurance agent component 158 can input (e.g., using interaction component 110) data, representing a proposal to sell a capacity for consuming or producing electricity by an insurer member of system 100. For instance, an insurance agent component 158 can input data, representing a proposal to obligate a member to act as a guarantor to compensate for missing consumption and/or missing production of a consumer member or producer member respectively in accordance with an executed contract. Furthermore, a member can be represented by one or more agent component such that a producer member can be represented by an insurance agent component 158 and a producer agent component 154. Also, an agent, (e.g., via an agent component) can represent a member in different capacities such that one agent can act as an insurance agent (e.g., using insurance agent component 158) and/or a producer agent (e.g., using producer agent component 154) to a member (e.g., producer member).

The system 100 can also employ an execution component 120 that facilitates execution of contracts between a subset of the agent components based on the first information. In an aspect, the contracts, based on data input by a subset of agent components, can include contracts to purchase electricity (e.g., contract for a consumer to purchase electricity from a producer of electricity), a contract to sell electricity (e.g., contract for a producer of electricity to sell to a consumer of electricity), a contract to transport electricity (e.g., a contract for an electric grid to transport electricity a given distance), or an insurance contract to guarantee the terms of another contract are satisfied. In an aspect, the insurance contract can obligate an insurer to consume (e.g., storing the electricity or using the electricity) excess electricity or produce additional electricity (e.g., generating more electricity in the event of a shortfall). In some contracts, an insurer of consumption obligations and/or an insurer of production obligations do not have to be the same party. For example, insurer A can provide insurance to consume (e.g., store) excess electricity associated with a contract and/or insurer B can provide insurance to produce extra electricity associated with the same contract in the event that an electricity shortfall occurs.

In an aspect, the contracts executed (e.g., using execution component 120) can be associated with a range of member types. For instance, a long-term contract to produce or generate electricity can be offered by larger providers to consumers via distribution utilities based on a predictable future demand for electricity. In another instance, competitive suppliers of electricity can market directly to consumers (as opposed to through a distribution utility) based on a predicted future demand for electricity. Other members can include public power entities and/or co-operatives whom, in some capacity, have an obligation to serve consumers.

In an aspect, contracts can be executed based on data representing various infrastructure and/or logistical factors such as location of producer member facilities and/or consumer member facilities, and/or cost of electricity transportation, capacity (e.g., load) to transport an amount of electricity at a given date and/or time. Furthermore, contracts can be executed between agent components operating on one or more devices representing independent producers and/or consumers of electricity. For instance, individuals can profit from selling electricity, generated using its own home, directly to an electric grid. On the other hand, a consumer agent component 152 can input data representing instructions (e.g., executed by processor 112) to facilitate a purchase of electricity at a cheaper price reflective of efficient market economic characteristics enabled by system 100C and/or can circumvent allow agent components to facilitate execution of contracts absent any need for intermediaries (e.g., devices representing electricity distribution, production, consumption middle-men). In another aspect, system 100 can be employed on member hardware (e.g., desktop computers, tablets, smart phones, servers, etc.) and/or agent owned hardware and/or those agent components hosted on the members' hardware can be granted access to member data to effect trades. For instance, consumer agent component 152 can be hosted on device 102, producer agent component 154 can be hosted on device 104, grid agent component 156 can be hosted on device 106, and/or insurance agent component 158 can be hosted on device 109. As such, device 102, device 104, device 106, and/or device 109 can be owned by independent members and/or such devices can facilitate agent components to access member data stored on or accessible by such devices.

The agent components can also facilitate the execution (e.g., using execution component 120) of contracts based on one or more calculations, determination configurations, and/or trading algorithms. For instance, in an aspect, consumer agent component 152 can utilize data representing estimates of future demand for electrical energy to negotiate a favorable purchase price for electricity at a later date. In another aspect, consumer agent component 152 can utilize historical statistical data and/or member provided consumption data to facilitate a determination of consumer behavior, producer behavior, and/or reasonable prices associated with the consumption of electricity. The consumer agent component 152 can employ artificial intelligence (e.g., machine learning techniques, deep learning techniques, etc.) to infer future energy needs. The artificial intelligence can utilize historical data, statistics, and/or trends to approximate within a high level of confidence the macro-economic demand for energy at a future date and/or time as well as the estimated demand of the consumer member represented by the consumer agent component 152 at a future date and/or time. Accordingly, consumer agent component 152 can negotiate the purchase (e.g., using interaction component 110) of defined amounts of electrical energy for a future date at favorable prices being equipped with predictive information.

In yet another aspect, producer agent component 154 can utilize data representing estimates of future production of energy based on respective types of energy generation sources. For instance, a producer agent component 154 can utilize data estimating the future production of electricity generated from wind based energy sources (e.g., wind mills) factoring in weather forecast data and/or other production influencing data sets. The producer agent component 154 can employ artificial intelligence (e.g., machine learning techniques, deep learning techniques, etc.) to infer future energy production amounts. The artificial intelligence can utilize historical data, statistics, and/or trends to approximate within a high level of confidence energy production amounts to be supplied at a future date and/or time from a macro-economic perspective and/or from an individual producer member perspective. Accordingly, producer agent component 154 can negotiate the favorable sale (e.g., using interaction component 110) of defined amounts of electrical energy (at a date in the future) in a trading room by contacting and/or interacting with other agent components. The producer agent component 154 equipped with predictive information can negotiate the provisioning of energy at dates and/or times that garner the highest price for its represented producer member. The producer agent component 154 can also utilize weather forecast data in connection with historical statistical data of past weather patterns to determine whether an insurance contract should be purchased and/or at what level of coverage to protect the producer member against failure to meet the production conditions obligated by an executed contract.

In an aspect, an executed contract (e.g., using execution component 120) between a consumer agent component 152 and a producer agent component 154 that obligates a consumer member and/or provider member to obligations expressed in one or more contract terms may accommodate flexible transactional activities. For instance, a consumer agent component 152 (on behalf of a consumer member) may execute a contract with a term that obligates the producer member to provide a minimum amount of electricity to a consumer member on a given date and/or during a given time slot, however the term may obligate or entitle the consumer member to consume more electrical energy should the producer member provide such electrical energy (e.g., up to a maximum amount of electricity for consumption). As such, contracts can include flexible terms that accommodate variability in operational outcomes associated with one or more energy generation resources (e.g., renewable energy production) and/or the variable factors it relies on.

Furthermore, in an instance where a consumer agent component 152 inputs data that facilitates a proposal of contractual flexibility related to consumption of energy by a consumer member from a provider member, the consumer agent component 152 can input (e.g., using interaction component 110) data to system 100 to facilitate the negotiation of lower prices (e.g., with a producer agent component 154) to purchase such electricity. For instance, the greater performance flexibility a provider is granted from a consumer, the less is the need to purchase insurance for a contract. For instance, if a provider has a wide range of energy units within which it must provide to a consumer during a given date or between a long time period, then the purchase of insurance by the provider may not be needed because the risk of defaulting on such flexible obligations are lower. Accordingly, contracts requiring less or no insurance can have a lower expense to the provider member and such savings can be passed on to the consumer member in the form of a lower purchase price for electricity. The capability of a consumer agent component 152 to input data representing an offer to sell consumption flexibility to obtain lower purchase prices contributes to the market price stabilization of electricity through the electric grid.

In yet another instance, a consumer member (e.g., via a consumer agent component 152) can also input data representing an offer to seize to consume electricity on demand (despite the ability to consume such energy at a given time), pursuant to an executed contract (e.g., using execution component 120) to further contribute to grid stabilization and counter-balance variable fluctuations in electricity production from renewable energy sources. As an example, facilities that include cooling operations (e.g., meat storage lockers) can maintain cooling operations even after seizing to consume electricity for periods of time. Consumer agent component 152 representing these type of consumer members can input data (e.g., using interaction component 110) to present a contract proposal that obligate or entitle them to turn off its electricity consumption at periods of time to contribute to stabilization of the electrical grid.

In another aspect, grid agent component 156 representing an electrical grid energy transporter can input data (e.g., using interaction component 110) that propose negotiable terms and/or execute a contract (e.g., using execution component 120) to guarantee the transport of electricity in accordance with an executed contract. In an aspect, a grid agent component 156 can input data (e.g., using interaction component 110) to facilitate an execution of a contract to guarantee the transport of electricity to a target destination for a quoted price. The grid agent component 156 can also determine a transportation price and/or input data (e.g., using interaction component 110) by identifying supply and demand conditions for transportation services based on one or more data sets including data representing a level of demand for transportation services, a supply level of transportation service providers, free storage or transport capacity of the electrical grid, data representing the distance the electricity must travel, and/or data representing the amount of electricity the grid agent component 156 guarantees in a contract. In an instance, a grid agent component 156 may not require that another party to a contract obtain insurance depending on various underwriting factors such as whether transport capacity of one or more electrical grid based transportation route is known and the impact of unknown factors such as weather.

By establishing a price of transport capacity, grid agent component 156 can facilitate an optimization of the energy flow within the electric grid. For instance, based on the cost of transport between several locations, the grid agent component 156 can determine which routes of delivery and/or destinations for delivery are optimal for its represented grid member to undertake. Consequently, a consumer agent component 152 can shop for the most competitive offer price amount of electricity to satisfy a need, etc.) from a set of producer agent components while also taking into account known transportation costs a set of grid agent components. The purchase of electricity is made more efficient in this scenario where all stakeholders can freely communicate and interact (e.g., using interaction components).

In another aspect, system 100C can facilitate an interaction (e.g., using interaction component 110) and/or integration with system components associated with advanced electric grid models and/or infrastructure that are more flexible than traditional electric grid models. The system 100 can integrate with such system components to facilitate the execution (e.g., using execution component 120) of power transactions that allow for the transmission of electricity generated from conventional energy sources (e.g., power plants, large utilities, etc.) and/or alternative energy sources (e.g., weather dependent sources such as photovoltaic sources, wind sources, etc.) to ensure the reliability and/or stability of the electric grid by using virtual power plant and/or smart grid technologies.

In another aspect, system 100C allows for a wide range of user devices to participate in executing power transactions including individual homeowners and/or large institutional power organizations whom seek to sell or purchase electricity. As such, system 100C can facilitate the creation of a marketplace for the communication between numerous devices, where such marketplace can allow for the reduction in large variations in electrical energy production and/or wide fluctuations in the price of electrical energy that occur with power transactions executed on traditional electricity markets because system 100C can allow for the participation of many devices rather than only a few devices in performing power transactions.

Consequently, the majority of electricity consumers (e.g., via consumer devices) whom traditionally were unable to participate in the purchasing and/or selling of electricity on restricted energy markets can access the energy markets using devices that employ one or more agent components. Thus, such participating devices can face lower purchase and/or sale prices of electricity due to the lack of needing to engage intermediaries or incur intermediate expenses by accessing (using one or more devices) system 100C.

In another aspect, the agent components employed by one or more devices can facilitate an open marketplace for device interactions (e.g., using interaction component 110). The marketplace represented by system 100C can comprise a set of software components that can integrate with and/or utilize features of virtual power plants and/or smart grid technologies such as smart meter devices. Furthermore, the system can allow for the interaction, negotiation, and/or execution of agreements between various agent components (e.g., represented as objects in the marketplace) employed by marketplace member devices. The member devices, represented by the agent components, can be operated by a device (e.g., controlled by one or more person, an artificial person, or an entity) capable of performing any one or more energy transactional activity such as purchasing energy for consumption, selling energy by a producer device, transporting energy from a producer device to a consumer device, or assuring (e.g., by providing insurance) that obligations (e.g., obligations of consuming, supplying, or transporting electricity) undertaken by an energy producer device or energy consumer device are fulfilled.

In an aspect, one or more agent components employed by an energy producer device (e.g., device 104), energy consumer device (e.g., device 102), energy transportation device (e.g., device 106), or energy transaction insurer (e.g., device 109) can execute transactions on behalf of the member device it represents. The agent component (e.g., an object) can operate on a members' hardware (e.g. device such as a computer, smart phone, set top box, laptop, tablet, server, etc.) to execute (e.g., using execution component 120) transactions over the energy marketplace.

In some aspects, the marketplace can be a cloud based software system (e.g., located on one or more central servers) comprising different components that can be accessed by hardware (e.g. a members' hardware). The marketplace can provide a virtual location such as a trading room at which one or more agent components can interact (e.g., using interaction component 110), communicate, exchange data associated with a contract negotiation, and/or execute (e.g., using execution component 120) contracts between one another. The contracts can be executed (e.g., via agent components) in a direct manner (e.g., absent seller or purchaser intermediary devices such as electric utility devices).

In another aspect, the agent components of the one or more member devices (e.g., consumers, producers, transporters, insurers, etc.) of a contract can serve different roles in the marketplace (e.g., system 100C). For instance, an agent component can represent a consumer device, producer device, carrier device, and/or insurance provider device in a single transaction or multiple transactions. In the case of an insurance agent component 158, such component can, on behalf of an insurer device, input data representing an agreement to consume or store an excess amount of energy (e.g., not consumed) or agree to supply excess energy (e.g., upon the occurrence of a supply shortage) should there be a need for such activities or should a contract between one or more agent components fail to be fulfilled. Thus an agent component that is capable of representing a member device in different roles can input data that manages the generation, transportation, and/or consummation of electrical energy on behalf of one or more member devices.

Accordingly, an energy producer device (e.g., device that facilitates production of regenerative electricity or conventional electricity) that is able to store energy (e.g., using rechargeable battery packs, pumps, hydroelectric power stations, etc.) can utilize the components of system 100 to facilitate a receipt of an optimal amount of income in a competitive market. In a competitive market (e.g., system 100C) a producer device (e.g., via producer agent component 154) can input data representing a proposal to sell energy to one or more consumer devices or sell insurance policies (e.g., to provide an extra supply of electricity in the event of a shortfall) guaranteeing that other member devices contract obligations to supply energy would be fulfilled. As such, a producer device (e.g., device 104) that inputs (using producer agent component 154) data representing a proposal to sell energy on a competitive and/or open marketplace can ensure (or increase the likelihood) that the producer device is making the most money for each unit of energy produced by the producer device. Furthermore, an energy consumer device (e.g., device 102) that inputs (e.g., using consumer agent component 152) data representing a request to purchase energy on the marketplace can rely on an open marketplace to provide (or increase the likelihood of providing) minimum costs to consume energy.

In an aspect, the device 102 can employ consumer agent component 152 to input data representing a request to purchase energy at a low cost over the marketplace (e.g., system 100C) because there may be less or no intermediary expenses (e.g., from utility devices). Thus, there are fewer or no intermediaries that traditionally contribute to price upcharges. Instead, the device 102 can interface with the device 104 (e.g., device owned by a wholesale energy producer) that can submit input data representing and/or propose minimum (or lower) prices to purchase energy.

Furthermore, the consumer device can submit input data representing direct requests for service proposals from grid agent components (e.g., grid agent component 156). In an aspect, these direct interactions, absent intermediaries, can result in the device 102 receiving data representing a favorable energy transportation cost. This ability to execute direct contracts with wholesale device providers can allow one or more consumer devices to obtain data representing commitments for favorable fees and/or terms for the consumption of energy. Furthermore, boundary conditions can factor into a favorable cost of consumption, such that the consumer purchase price can be based on such boundary conditions (e.g., production reliability factors, demand growth forecasts, discount rates, local grid characteristics, etc.).

In another aspect, system 100C can allow an agent component employed by a consumer device to determine the optimal location and/or amount of electricity production required to meet a current demand of electricity. Thus, agent component (connected to other agent components of system 100C) can determine an optimal solution for its client device by taking into account the current needs of a client device in relation to market information that indicate favorable pricing for energy based on such client needs. For instance, a producer device in location A may offer a cheaper price of electricity to a consumer device at location B, however the transportation costs associated with consumption of such electricity may be more expensive than a transportation cost associated with electricity from another producer device at location B with a higher offering price. Thus, the aggregate price that includes the production fees and/or transportation fees can affect the buying habits associated with a consumer device.

Accordingly, the consumer device can rely on the competitiveness of the energy market to ensure (or increase the likelihood) of receipt of the cheapest (or low) price offers to purchase energy. In another aspect, the system 100C can also optimize (or improve) the process of transporting electricity such that transportation costs as well as production costs are minimized (or reduced) in comparison to conventional electricity transmission models. One or more aspects can allow for a single agent component to act in different roles on behalf of different devices (e.g., consumer device, producer device, carrier device, insurance provider device) to handle different transactional energy activities, such as the generation, transportation, and/or consummation of electrical energy. In an instance, an agent component can be employed by a device to generate and/or input data that represents offers to purchase of electricity at the cheapest rate.

The same agent component can also represent the device in the capacity of an insurance agent component 158 such that the device can input data in system 100C representing an offer to provide insurance guaranteeing the consumption of energy (e.g., on days when excess consumption capacity exists) in accordance with a given set of contracts should a surplus of electricity exist. Not only can system 100C employ agent components that can generate, access, and/or input data into interaction component 110 in various agency role capacities, but system 100C can also facilitate the deployment of an electricity exchange mechanism that minimizes or eliminates the need for excess storage capacity on the electric grid. The consumer devices, producer devices, and/or insurer devices executing power transactions via system 100C can ensure that on any given day all electricity produced will also be simultaneously consumed.

Figure 2A:
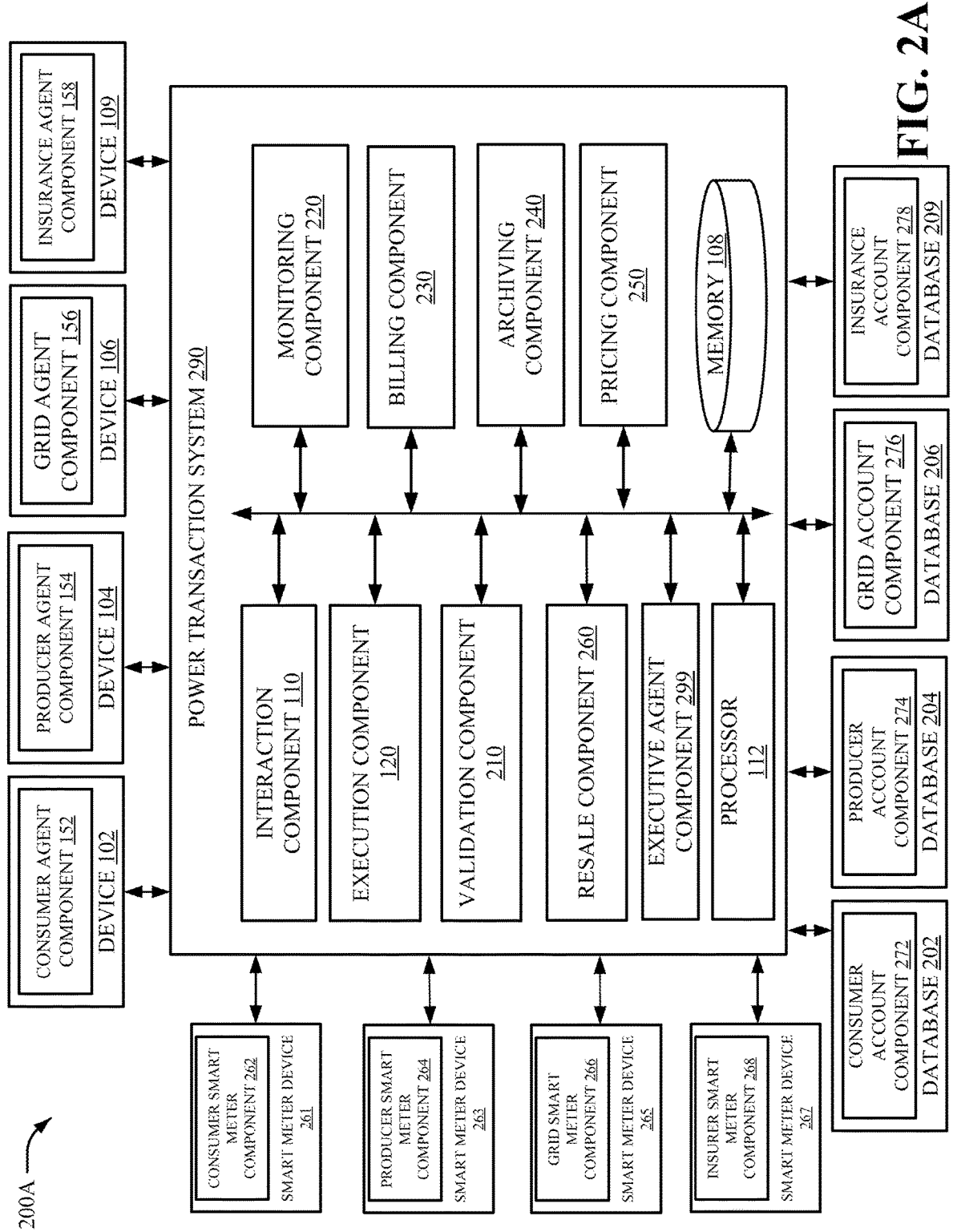
FIG. 2A illustrates a block diagram of another example, non-limiting system that can facilitate an interaction between a set of agent components to facilitate one or more power transactions in accordance with one or more embodiments described herein.

FIG. 2A illustrates a block diagram of another example, non-limiting system that can facilitate an interaction between a set of agent components to facilitate one or more power transactions in accordance with one or more embodiments described herein. For example, a device 102 can employ consumer agent component 152 to interact with device 104 employing a producer agent component 154, device 106 employing a grid agent component 156, and/or device 109 that can employ insurance agent component 158 to facilitate a power transaction comprising the purchase, generation, sale, and/or provisioning of energy. Furthermore, a billing component 230 can transfer money between one or more accounts associated with device 102, device 104, device 106, and/or device 109 based on the interactions between the one or more devices.

Accordingly, FIG. 2A illustrates a system 200A that can comprise a power transaction system 290 comprising interaction component 110, execution component 120, validation component 210, monitoring component 220, billing component 230, archiving component 240, pricing component 250, resale component 260, and/or executive agent component 299. The power transaction system 290 can also include or otherwise be associated with one or more processors, such as processor 112 that can execute the computer executable components and/or computer instructions stored in memory 108. In another aspect, system 200A can comprise consumer agent component 152, producer agent component 154, grid agent component 156, insurance agent component 158, device 102, device 104, device, 106, device 109, consumer smart meter component 262, producer smart meter component 264, grid smart meter component 266, insurer smart meter component 268, smart meter device 261, smart meter device 263, smart meter device 265, smart meter device 267, consumer account component 272, producer account component 274, grid account component 276, and/or insurance account component 278, database 202, database 204, database 206, and/or database 209. In an aspect, one or more of the components of system 200A can be electrically and/or communicatively coupled to one or more devices of system 200A or other embodiments disclosed herein.

In an aspect, system 200A can include interaction component 110 and execution component 120. In another aspect, interaction component 110 can rank one or more candidate contracts eligible for execution based on a user preference, a ranking preference by the subset of agent component, or a policy. Accordingly, candidate contracts can be presented to one or more agent components and the agent components can rank (e.g., using interaction component 110) its preference for respective candidate contracts. In another aspect, system 200A can employ executive agent component 299 that selects the contracts for the execution from one or more ranked candidate contracts based on a ranking by the interaction component 110. In an aspect, the ranking (e.g., using interaction component 110) of one or more candidate contracts eligible for the execution (e.g., using execution component 120) can be based on a user preference, a ranking preference by the subset of the set of agent components (e.g., allows for selection of contracts based on a device operator judgment), or a policy (e.g., an automated ranking mechanism according to policy criteria). For instance, a member device can execute a contract by intervening in place of or in the absence of another agent component and ranking (e.g., using interaction component 110) candidate contracts for execution based on preferential criteria. Furthermore, in an aspect, the execution component 120 can facilitate the execution of one or more ranked contracts between a subset of the agent components.

As such, in an aspect, the member device can rank one or more candidate contracts for execution based on a policy or a user choice (e.g., subjective judgment of the user operating the member device). In an aspect, a policy ranking of the one or more candidate contracts can include policy instructions related to the energy transaction activity (e.g., consumption amount limits, sales price maximum/minimum, transportation logistical requirements, production maximum capacities, etc.). In another aspect, a user choice ranking can include a preference of the user for ranking one or candidate contract for execution. In an aspect, a preference can be subjective and based on complete discretion of the member device operator. Thus, a member device can employ executive agent component 299 of power transaction system 290 to rank and select candidate contracts for execution based on member device preferences.

In another aspect, system 200A can include validation component 210 that can validate at least one of the contracts. The contracts executed (e.g., by execution component 120) can include obligations, liabilities, rights, prohibitions, promises, exclusions, and/or other such contractual terms. In another aspect, system 200A can employ validation component 210 to validate whether the activities, terms, and/or conditions of the contract support the maintenance and/or stability of energy infrastructure such as the electrical grid. For instance, one or more executed contracts can obligate one or more consumer members to consume electricity on a given date and/or time and a producer member to provide electricity (e.g., using a producer member device or production facility) on the same given date and/or time. If another contract is executed (e.g., using execution component 120) that obligates a different consumer member and/or a different production member to consume and/or produce electricity, then the contract can be validated to see if the electricity infrastructure, at that given date and/or time, can sustain the obligations and/or activities to be performed subject to the performance of all outstanding contract obligations including those in the newly executed contract.

The validation component 210 can validate a contract based on data sets such as data representing whether an electrical grid can be destabilized from performance of power transactional activities (e.g., provisioning, consuming, or transporting energy) pursuant to executed contracts. For instance, validation component 210 can access data associated with all power transactions that occur on the date the transactional activity is to be performed pursuant to the executed contract terms. As such, the validation component 210 can access data representing the total amount of energy to be produced (e.g., by a producer device or insurance device) on such date and/or the total amount of energy to be consumed (e.g., by a consumer device or insurance device) on such date. The validation component 210 can utilize such accessed data to determine whether the additional transaction activity associated with the executed contract will overload an electric grid transmission and/or storage capabilities or satisfy maximum (or defined) load requirements. As such, the validation component 210 can validate the executed contract or invalidate the executed contract based on an evaluation of data representing electric grid transmission requirements and/or power transaction activities.

In another aspect, validation component 210 can access other sets of data to validate or invalidate an executed contract. In an aspect, the data sets can include data representing changes in power (both generated and consumed) undertaken by entities affiliated with the electricity grid, data representing the impact of contract performance on the electric grid load and/or associated capability of independent entities to undertake varying load levels (e.g., load storage capabilities of consumption insurance members), data representing load sharing capabilities between electricity generators, data representing total power regulation factors (e.g., the magnitude of load increases to the electric grid), and/or data representing infrastructural adjustments that occur in connection with buying and selling power (e.g., increasing or decreasing electricity generator production).

The stability of the electricity grid can be represented by a steady balance between production and/or consumption of electricity through the electricity grid. As such, validation component 210 can access supply requirement data and/or demand requirement data to validate the contracts and/or ensure that there is sufficient consumption demand and production supply on at a given date and/or time. The validating can also consider data representing potential deviations in estimations of electricity consumption and/or production capabilities. For instance, if the weather on a given day delivers an unanticipated cold spell, electricity consumption can dramatically increase. Thus, the validation (e.g., using validation component 210) of a contract can include accessing data to validate the sustainability to the electric grid of obligated electricity consumption amount associated with the contract as compared to the total consumption amount committed on that date while taking into account a consumption cushion for unanticipated additional consumption.

In a non-limiting embodiment, system 200A can also employ monitoring component 220 that collects data regarding flow of electricity from one or more metering components, wherein the data comprises time stamps, member identification and/or energy consumption. In an aspect, monitoring component 220 can collect data about a flow of electricity such as the flow of electricity between a producer smart meter component 264 and an electricity grid as well as the flow of electricity between an electricity grid and a consumer smart meter component 262. The monitoring component 220 can monitor electricity flow data pursuant to an executed contract.

Furthermore, monitoring component 220 can receive or send data from/to a consumer smart meter component 262, a producer smart meter component 264, a grid smart meter component 266, or an insurer smart meter component 268. The smart meter components can be included within smart meter devices owned by various members. For instance, a consumer smart meter component 262 can be employed within a smart meter device 261 owned by a consumer member that allows for the tracking of data representing electricity inflows to or across a smart meter device 261. In another instance, a producer smart meter component 264 can be employed by smart meter device 263 of a producer member that allows for the tracking of data representing electricity outflows from or across a producer smart meter device 263. In yet another instance, a grid smart meter component 266 can be employed by smart meter device 265 of a grid member that allows for the tracking of data representing electricity transportation flows across an electrical grid between a smart meter device 263 and/or a smart meter device 261. In yet another instance, an insurer smart meter component 268 can be employed by smart meter device 267 of an insurance member that allows for the tracking of data representing electricity transportation inflows to or outflows from or across a smart meter device 267.

In a non-limiting example, a contract between a consumer member (e.g., using consumer agent component 152 executing on device 102) and a producer member (e.g., using producer agent component 154 executing on device 104) can require that the producer member produce a defined number of units of electricity and/or that the consumer member will purchase a defined number of units of electricity for a fixed price on a given day. Furthermore, the contract can also require a consumption insurer (e.g., using insurance agent component 158 executing on device 109) and/or a production insurer (e.g., using insurance agent component 158 executing on device 109) to guarantee that a level of electricity will be consumed or that a level of electricity will be produced should one of the parties be unable to perform its obligations under the contract. In an aspect, monitoring component 220 can monitor data representing the flow of electricity between the various parties to the contract, where such data can be accessed and/or used for validating (e.g., by validation component 210) as to whether contract obligations have been satisfied.

In another aspect, system 200A can also employ monitoring component 220 in connection with one or more smart meter components (e.g., consumer smart meter component 262, producer smart meter component 264, grid smart meter component 266, insurer smart meter component 268) to monitor and/or collect data from one or more smart meter devices such as a smart meter owned by the one or more parties to a contract. For example, monitoring component 220 in connection with producer smart meter component 264 can collect data from smart meter device 263 to track the flow of electricity out of the producer's facility (e.g., energy generation facility) to the electricity grid. Furthermore, the monitoring component 220 in connection with the grid smart meter component 266 can collect data from the electricity grid associated with a received flow of electricity transmitted from smart meter device 263 to smart meter device 265.

In an aspect, monitoring component 220 can collect data from smart meter devices that include time stamp data, member identification data, energy consumption data including an amount of electricity flowing to or from one or more smart meter devices. As such, monitoring component 220 can collect and/or monitor data associated with transactional activities performed pursuant to contract obligations. The collected data can be preprocessed and/or stored (e.g., within memory 108) for use by system 200A components such as components associated with billing and/or verification (e.g., using validation component 210) that can utilize data representing whether a contract has been fulfilled. In a non-limiting example embodiment, a contract can be closed and/or executed by execution component 120. The contract can then be validated by validation component 210. Furthermore, monitoring component 220 can commence monitoring smart meter devices and/or collecting data (e.g., data representing inflows and/or outflows of electricity) from such smart meter devices used or owned by the parties to the contract.

In another non-limiting embodiment, system 200A can also employ billing component 230 that utilizes second information from the validation component 210 and/or the monitoring component 220 to determine whether fulfillment of an executed contract occurred and/or also transfer money between parties to the contract based on such determination. In an aspect, billing component 230 can utilize the data collected by monitoring component 220 (e.g., data collected from consumer smart meter component 262, producer smart meter component 264, grid smart meter component 266, insurer smart meter component 268, etc.) to determine whether the requirements, terms, and/or conditions of the executed contract (e.g., party obligations, entitlements, liabilities, electricity flow requirements between defined parties, dates and/or times of electricity provisioning and/or consumption, etc.) have been fulfilled.

For instance, billing component 230 can access and/or analyze data that indicates whether an electricity flow has occurred from producer member X to consumer member Y and/or transmitted across an electricity grid controlled or owned by electricity grid member Z. In an aspect, billing component 230 can utilize data sent from producer smart meter component 264 including member identification information, electricity flow information, and/or time stamp information collected from smart meter device 263 owned by producer X to determine whether producer member X provided a correct amount of electricity and/or whether consumer member Y received a correct amount of electricity (e.g., evidenced by data collected by consumer smart meter component 262 from smart meter device 261) at the correct time in accordance with the executed contract as compared to the collected data. The billing component 230 can also analyze data to account for insurance members' contribution to the production flow or consumption flow of electricity as well. In an aspect, billing component 230 can facilitate a transfer of money between relevant party bank accounts. For instance, a producer member can own a producer account component 274 stored at a database 204, a consumption member can own a consumer account component 272 stored at database 202, a grid member can own a grid account component 276 stored at database 206, and/or an insurance provider (e.g., production insurance member, consumption insurance member, etc.) can own an insurance account component 278 stored at database 209.

Accordingly, upon fulfillment of a contract, billing component 230 can send data representing instructions to authorize and/or execute a transfer of payment from a consumer account component 272 located at database 202 to a producer account component 274 located at database 204. Furthermore, billing component 230 can also facilitate a transfer payment from a consumer account component 272 to an insurance account component 278 and/or a grid account component 276. Likewise, billing component 230 can also facilitate a transfer of payment from a producer account component 274 to an insurance account component 278 and/or a grid account component 276. In a non-limiting embodiment, the set of member account components can be located at the same database or several independent databases. In yet another aspect, billing component 230 can receive data collected by monitoring component 220 and/or validation data from validation component 210. The billing component 230 can assign received data to corresponding contract data to substantiate conducted payment activities (e.g., transfer of money between member accounts).

In another non-limiting embodiment, system 200A can also employ archiving component 240 that archives details associated with power transaction events corresponding to the contracts, one or more money transfer activities between one or more devices, and/or collected data regarding flow of electricity from a metering component. Furthermore, the data collected by monitoring component 220, smart meter components, and/or billing component 230 (e.g., data related to money transfers) can be archived (e.g., using archiving component 240) at a data store or memory 108. The archived data can be stored for long-term retention and/or accessed for active use at any time by system 200A. Thus, the archived data can include older data as well as recent data that may be important to agent components and/or devices, member components and/or devices, and operator components and/or devices for access and use in executing power transactions. The data can also be utilized for regulatory compliance purposes, to map data trends, to forecast future production and/or consumption trends, to prevent disruptions to power delivery processes, to predict appropriate time periods corresponding to optimal energy sale prices or optimal energy purchase prices, and/or to reconcile or clarify ambiguities related to the fulfillment of one or more executed contracts.

Furthermore, archived data can be utilized to forecast electricity demand, determine party usage patterns of electricity, prevent electricity power outages, optimize the transfer of electricity to and/or from the grid, better manage electricity production, consumption, transmission, and/or insurance activities. For instance, archiving component 240 can facilitate a consumer member to access archived data related to historical data corresponding to smart meter device 261 to better understand past consumption behavior as correlated to other data metrics such as cost of energy. Thus, a consumer members' consumption data and/or corresponding cost data may prove to be meaningful information for use by a consumer agent component 152. For instance, if a cost of electricity consumption increases during a particular time, then a consumer agent component 152 representing a consumer member that is a homeowner may curb its electricity use during a high cost time period (e.g., use washing machine and dishwasher at low consumption cost times of the day).

The archived data can also include other types of data related to operations, decision making, and/or planning activities. Thus, archived data can include map data of electric grid infrastructure such as transmission routes and/or forecasting data (e.g., demand data, supply data, weather data, usage data, etc.). Furthermore, archived data can include data associated with a transfer of money between member accounts, contract terms, data collected from monitoring component 220, and/or other such data. In an aspect, there is a large volume of data that system 200A can collect on a particular date due to the potentially large number of contracts capable of execution, numerous transactional and/or operational activities associated with the electric grid, and/or reoccurring readings of smart meter data. The archiving component 240 can store such data in an organized manner for efficient and/or expeditious access while also providing cybersecurity protocols and/or controls to ensure the data can be protected, retained for a long period of time, and/or complies with regulatory requirements.

In another non-limiting embodiment, system 200A can also employ pricing component 250 that sets energy prices as a function of energy supply and demand for the purchase, the generation, the sale, and/or the provisioning of energy. In an aspect, pricing component 250 can establish prices associated with the consumption, provisioning, transporting, and/or insuring of electricity taking into account market supply and/or market demand conditions. In another aspect, pricing component 250 can facilitate the establishment of a price of energy by evaluating collected data from monitoring component 220, including data representing amounts of electricity transmitted between relevant parties on identified dates. In an aspect, electricity consumption pricing can be based on the need for electricity at a certain time and/or energy production amount at such time.

In another aspect, pricing component 250 can establish prices for power transaction activities based on data representing factors such as pricing regulations, weather conditions (e.g., severe weather can affect the demand for electricity and/or costs to maintain the electricity grid), energy transmission infrastructure elements (e.g., costs to maintain and/or use the electricity transmission system to deliver electricity), producer costs (e.g., construction, maintenance and/or operating costs associated with a production facility), availability of different energy generation sources, type of customer and/or quantity of consumption (e.g., residential consumption may have a higher price because of higher associated distribution costs vs. industrial consumers whom use more electricity and/or have capabilities of receiving electricity at higher voltages), location of the consumer and/or producer, and/or timing of the transaction (e.g., peak times can have higher rates as compared to off-peak times).

In another non-limiting embodiment, system 200A can also employ a resale component 260 that determines portions of the contracts for assignment to third party producers to facilitate fulfillment of the contract. In an aspect, one or more agent components can use interaction component 110 to directly interact and/or trade with one or more agent components by exchanging information and/or executing contracts (e.g., using execution component 120) on behalf of members. However, the members can also achieve trading benefits by employing representative components (e.g., agency components) to input data representing instructions to propose a purchase and/or sale of executed contracts or portions of executed contracts from other members. For instance, if a member has underestimated its consumption need for a particular date and/or no agents will entertain a negotiation on such date, the agent component representing such member can input data (e.g., using interaction component 110) representing instructions to propose for sale an already executed electricity consumption contract for fulfillment by another member (e.g., member device) represented by an agent component. As such, agent components on behalf of entities may facilitate an execution of power transaction contracts with the intention of selling such executed contract to other members at a later date. Furthermore, other agent components on behalf of other entities may refrain from executing contracts if the represented entities consumption needs are uncertain and/or such agent components may input data inputting instructions representing an offer to purchase an executed contract from another agent component (e.g., representing a member) at a later period of time.

Figure 2B:
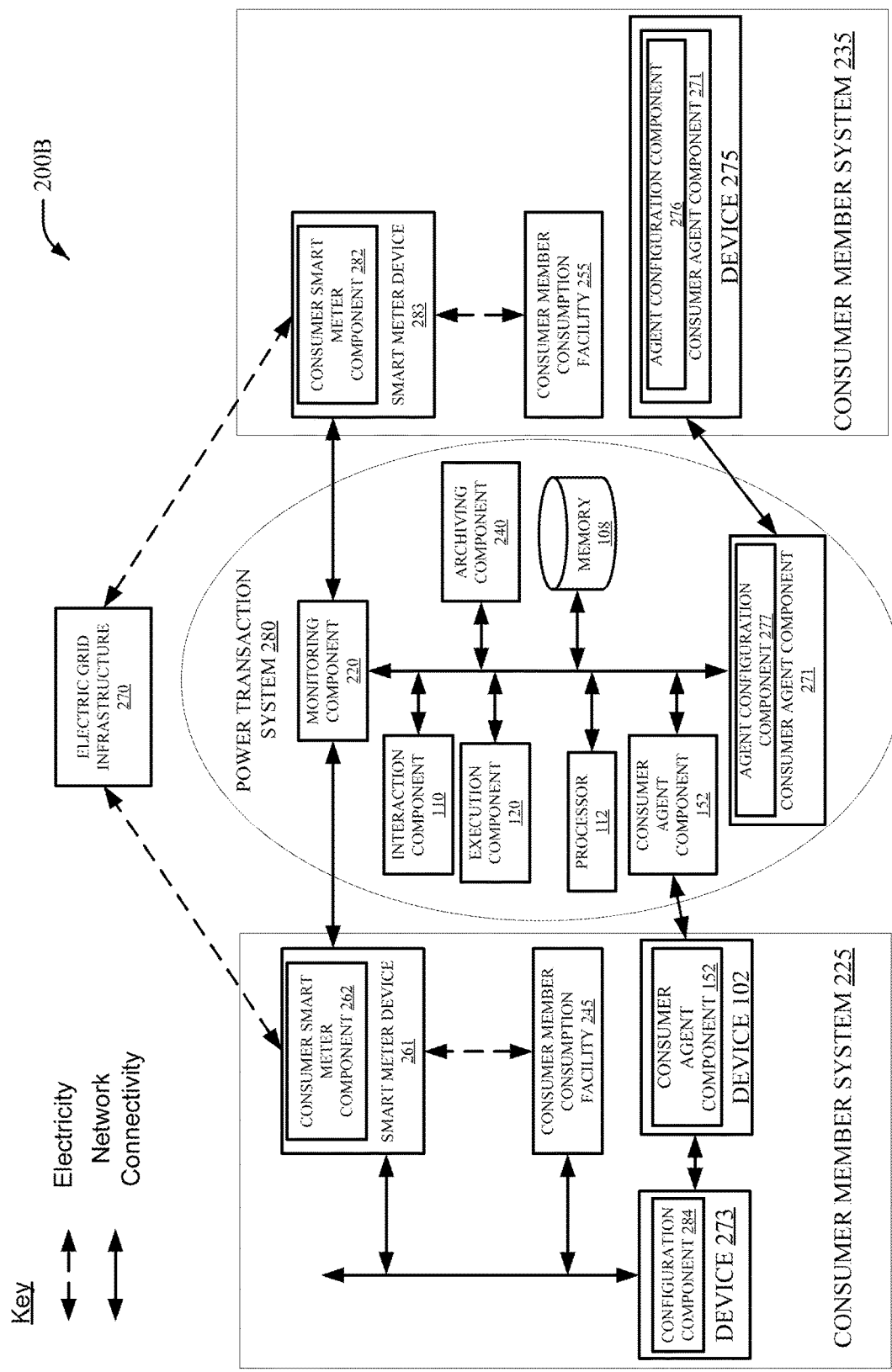
FIG. 2B illustrates a block diagram of an example, non-limiting system that can facilitate an interaction between a first agent component of a first consumer member system and a second agent component of a second consumer member system to facilitate one or more power transactions in accordance with one or more embodiments described herein.

FIG. 2B illustrates a block diagram of an example, non-limiting system 200B that can facilitate an interaction between a first agent component of a first consumer member system and/or a second agent component of a second consumer member system to facilitate one or more power transactions in accordance with one or more embodiments described herein. In an aspect, system 200B can comprise power transaction system 280, consumer member system 225, consumer member system 235, electric grid infrastructure 270. In an aspect, power transaction system 280 comprises interaction component 110, execution component 120, monitoring component 220, archiving component 240, consumer agent component 152, consumer agent component 271, and/or agent configuration component 277. The power transaction system 280 components can also include or otherwise be associated with one or more processors, such as processor 112 that can execute the computer executable components and/or computer instructions stored in memory 108.

In another aspect, consumer member system 225 can include configuration component 284, device 273, consumer agent component 152, device 102, consumer member consumption facility 245, consumer smart meter component 262, and/or smart meter device 261. In yet another aspect, consumer member system 235 includes consumer smart meter component 262, smart meter device 261, consumer member consumption facility 255, consumer agent component 271, agent configuration component 277, and/or device 275. In an aspect, system 200B illustrates the use of power transaction system 280 between two energy consumer systems (e.g., consumer member system 225 and/or consumer member system 235). A first consumer member can own the resources, technologies, systems, and/or devices of consumer member system 225. In an aspect, the first consumer member uses consumer member system 225 to transmit energy across electric grid infrastructure 270 with assistance from advanced technologies. In an aspect, one or more of the components of system 200B can be electrically and/or communicatively coupled to one or more devices of system 200B or other embodiments disclosed herein.

For instance, consumer member system 225 can utilize consumer smart meter component 262 to collect data corresponding to inflows or outflows of energy to smart meter device 261 (e.g., a smart meter) and onward to consumer member consumption facility 245 (e.g., a business, warehouse, factory, etc.). In an aspect, consumer member system 225 also utilizes configuration component 184 executing on device 273. The configuration component 284 can utilize third party configuration software that can access historical data and/or statistics regarding consumption behavior, energy prices, and/or other useful transactional information. Furthermore, configuration component 284 can connect to all devices within a consumer ecosystem (e.g., consumer member system 225). Also, configuration component 284 can perform enhanced data processing operations and/or perform value-add operations such as facilitating a prediction of future electricity demands, accessing archived data in connection with archiving component 240, and/or accessing collected data on the flow of electricity in connection with monitoring component 220. In an aspect, consumer agent component 152 on device 102 can access and/or use the data accessed by configuration component 284 to negotiate and/or execute optimal contracts for the first consumer member of consumer member system 225 using power transaction system 190.

For instance, consumer agent component 152 can be employed on device 102 within consumer member system 225 or on power transaction system 290. Thus, consumer agent component 152 can utilize data from consumer member system 225 components such as configuration component 284 and/or data from power transaction system 290 such as data representing energy unit costs, scale of current energy supply and/or other such data to perform effective negotiations and/or execute a contract with favorable terms. In another aspect, consumer member system 225 can utilize consumer smart meter component 282 executing on smart meter device 283 to collect data representing inflows or outflows of energy to smart meter device 283 (e.g., a smart meter) and/or onward to consumer member consumption facility 255 which can be a traditional or conventional user of electricity, such as an individual home.

In an aspect, consumer member system 235 unlike consumer member system 225 does not include a configuration component 284 and/or thus does not have access to statistical data and/or historical data related to electricity consumption in the same way that consumer member system 225 does. However, consumer member system 235 still has access to energy transactions using power transaction system 290 via consumer agent component 271. Furthermore, consumer member system 235 has access to statistical and/or historical data via agent configuration component 277 executing on device 275. Thus, even a traditional energy consumer that traditionally interacts with the electric grid infrastructure 270 in a passive capacity can access the power transaction system 290 and gain access to a competitive marketplace for purchasing energy.

In an aspect, consumer agent component 271 can effectively negotiate and/or access data to secure a favorable contract to consume energy for the consumer member that owns consumer member system 235. Furthermore, the capability of consumer agent component 271 to operate on both a device 275 owned by the consumer member and on power transaction system 290 provides a level of access by consumer members to markets that was not possible in conventional technologies. Also, the ability for consumer agent component 271 to employ an agent configuration component 277 that allows the agent component to access the power transaction system 290 on behalf of consumer member system 235 can create an affordable alternative to smaller and/or more traditional energy consumers (e.g., homes) as compared to purchasing expensive third party software configured to access the power transaction system 290. In another aspect, consumer agent component 271 can execute tasks in connection with monitoring component 220, archiving component 240, and/or other components of power transaction system 290. Thus, consumer agent component 271 can access data collected by monitoring component 220 and/or historical data archived by archiving component 240 and/or convey such information to consumer member system 235. Furthermore, such data can be used by consumer agent component 271 to build a feedback loop that informs purchasing decisions by consumer agent component 271, on behalf of consumer member system 235, for future transactions.

Figure 2C:
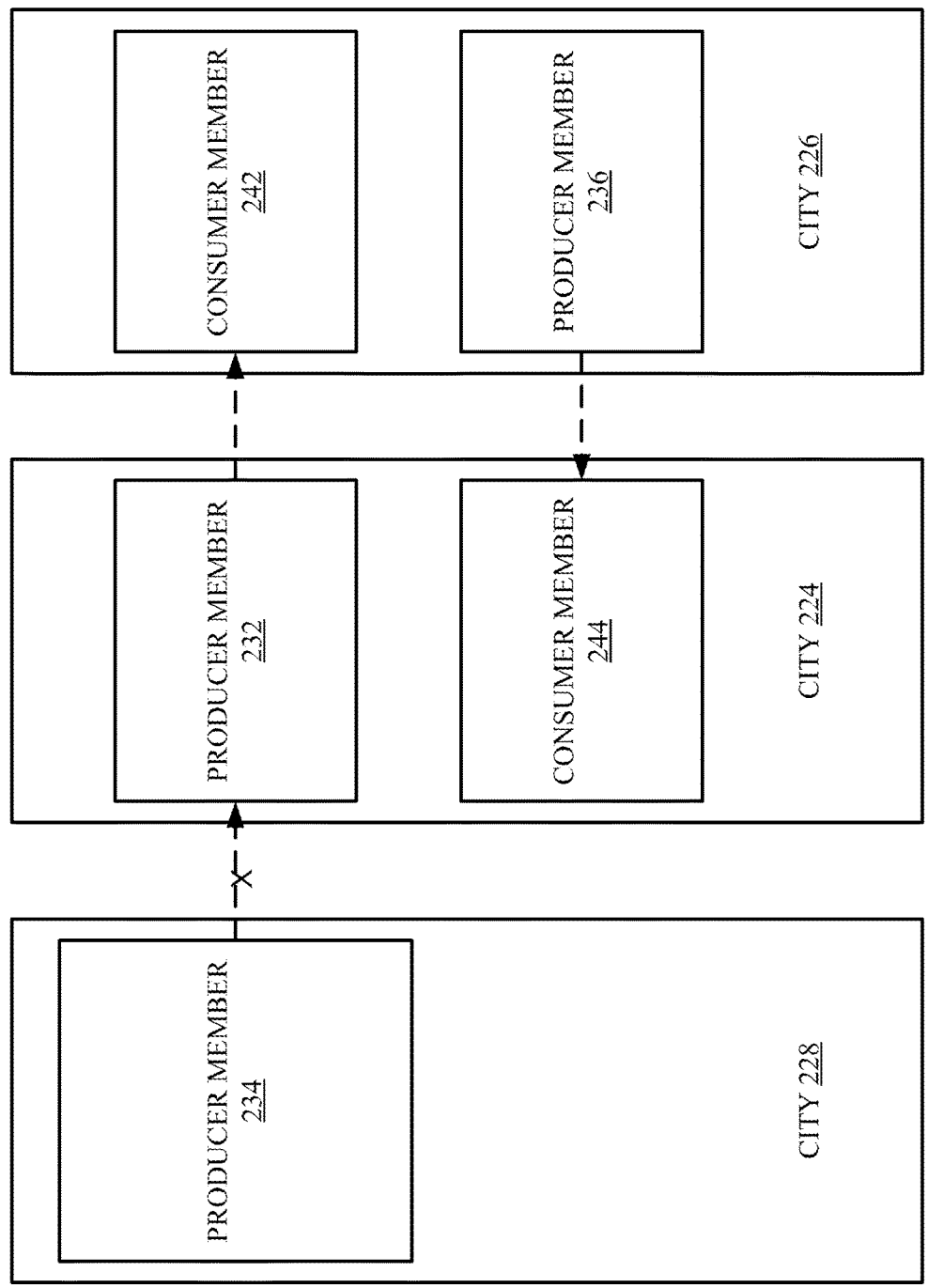
FIG. 2C illustrates a block diagram of an example, non-limiting logical flow of electricity between one or more energy producers and/or energy consumers located in one or more cities in accordance with one or more embodiments described herein.

FIG. 2C illustrates a block diagram of an example, non-limiting logical flow of electricity between one or more energy producers and/or energy consumers located in one or more cities in accordance with one or more embodiments described herein. In an aspect, flow diagram 200C representing a logical flow of electricity in a non-limiting example scenario of energy transactions between producer members, consumer members and/or grid members in different locations. In an aspect, producer member 232 (e.g., a producer of electrical energy) located in city 224 can transmit energy across an electric grid to consumer member 242 (e.g., a consumer of electrical energy) located in city 226. Subsequent to this arrangement (e.g., negotiated between agent components that represent producer member 232 and/or consumer member 242), consumer member 244 arrives in city 224 and/or can purchase energy from producer member 236 located in city 226 or producer member 234 located in city 228. In an instance, producer member 234 located in city 228 offers cheaper energy prices per unit than producer member 236 in city 226, however, a grid agent component on behalf of a grid member that transports the energy charges a greater cost to transport the energy from city 228 to city 224 as compared with another grid member that transports energy from city 226 to city 224.

Accordingly, consumer member 244 chooses to purchase energy from producer member 236 because of the cheaper aggregate price of energy (e.g., consumptions costs and/or transport costs). Thus, flow diagram 200C illustrates how power transaction system 190 and/or other system embodiments can empower energy consumers to secure an optimal price for energy. Furthermore, producers, consumers, transporters, and/or insurers of energy can compete in an efficient market to allow for greater fairness, transparency, consumer choice, and/or prices related to one or more energy transactions.

FIG. 2D illustrates a block diagram of an example, non-limiting physical flow of electricity between one or more energy producers and/or one or more energy consumers located in one or more cities in accordance with one or more embodiments described herein. In an aspect, flow diagram 200D representing a physical flow of electricity in a non-limiting example scenario of energy transactions between producer members, consumer members and/or grid members in different locations. As illustrated in flow diagram 200C, a contract has been executed between producer member 236 and/or consumer member 244 for producer member 236 to produce energy to be consumed by consumer member 244. Despite such contractual arrangement the actual physical flow of energy can occur between producer member 232 to consumer member 244 located in city 224 and/or between consumer member 242 and/or producer member 236 located in city 226. Although a physical flow of electricity technically occurs between different parties, the contractual terms will warrant payment for such physical flow of electricity between the parties of the contract. The efficient transport of energy as per the physical flow of electricity occurs in accordance with flow diagram 200D in order for one or more electric grids that connects city 224 and/or city 226 to save transport capacity. If the physical flow of energy followed the logical flow of energy of the contract (e.g., illustrated in flow diagram 200C), then transport capacity of one or more electric grids that connects city 228 and/or city 224 as well as city 224 and/or city 226 would be diminished more than necessary therefore resulting in an inefficient transmission of energy.

Figure 3:
FIG. 3 illustrates a flow diagram of an example, non-limiting computer-implemented method that facilitates an interaction between a set of agent components of a system to facilitate one or more power transactions in accordance with one or more embodiments described herein.

FIG. 3 illustrates a flow diagram of an example, non-limiting computer-implemented method 300 that can facilitate an interaction between a set of agent components of a system to facilitate one or more power transactions in accordance with one or more embodiments described herein.

In an aspect, one or more of the components described in computer-implemented method 300 can be electrically and/or communicatively coupled to one or more devices. Repetitive description of like elements employed in other embodiments described herein is omitted for sake of brevity. In some implementations, at reference numeral 302, a system operatively coupled to a processor (e.g., processor 112) can receive (e.g., using interaction component 110) a first set of data from a set of agent components (e.g., consumer agent component 152, producer agent component 154, grid agent component 156, insurance agent component 158), wherein the set of data represents a purchase, a transmission, a production, a sale, and/or a consumption of energy. At reference numeral 304, the system can facilitate execution (e.g., using execution component 120) of a set of contracts between a first subset of agent components and/or a second subset of agent components.

Figure 4:
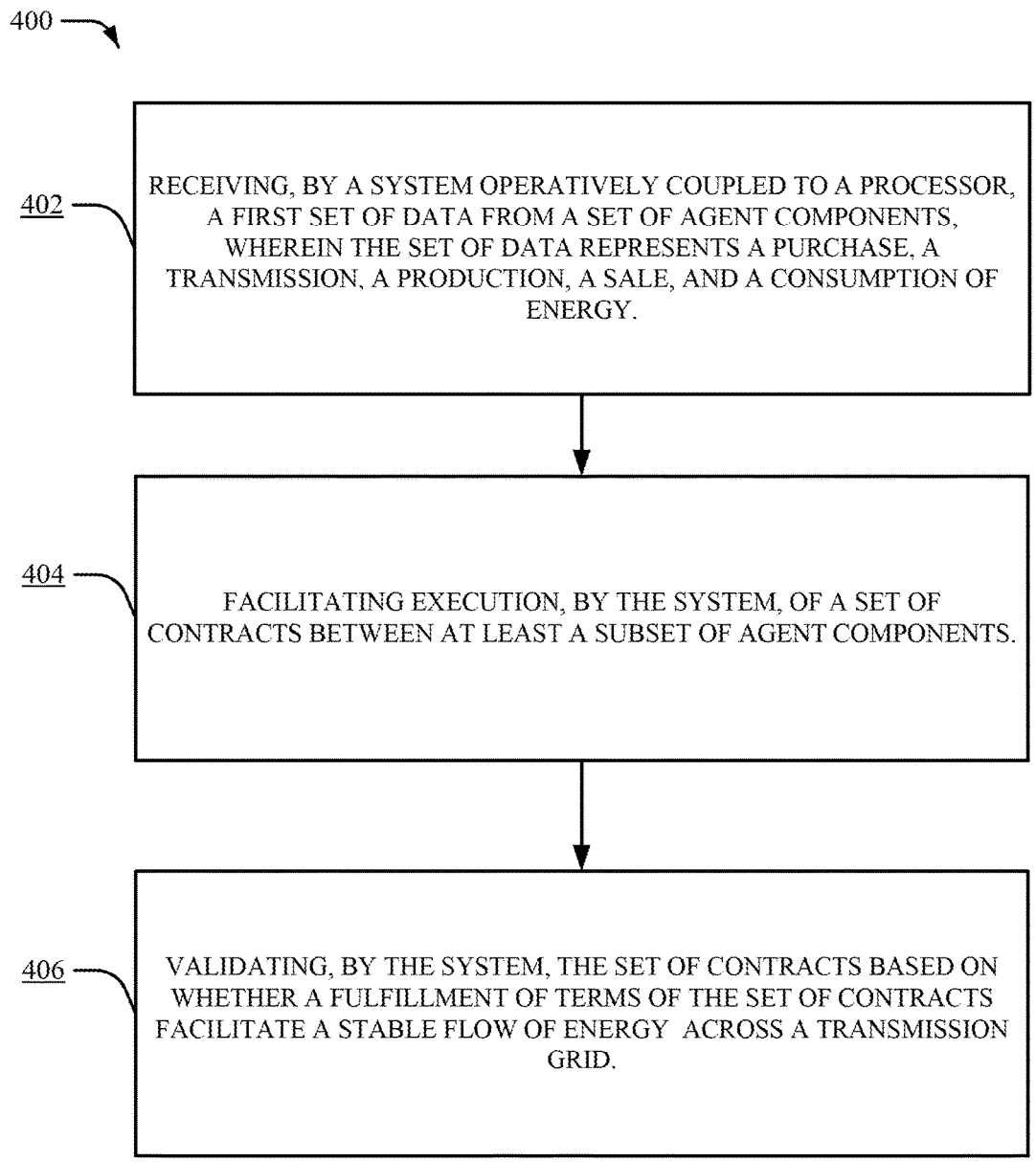
FIG. 4 illustrates a flow diagram of an example, non-limiting computer-implemented method that facilitates a validation of one or more contracts executed between a set of agent components of a system to facilitate one or more power transactions in accordance with one or more embodiments described herein.

FIG. 4 illustrates a flow diagram of an example, non-limiting computer-implemented method 400 that can facilitate a validation of one or more contracts executed between a set of agent components of a system to facilitate one or more power transactions in accordance with one or more embodiments described herein.

In an aspect, one or more of the components described in computer-implemented method 400 can be electrically and/or communicatively coupled to one or more devices. Repetitive description of like elements employed in other embodiments described herein is omitted for sake of brevity. In some implementations, at reference numeral 402, a system operatively coupled to a processor (e.g., processor 112) can receive (e.g., using interaction component 110) a first set of data from a set of agent components (e.g., consumer agent component 152, producer agent component 154, grid agent component 156, insurance agent component 158), wherein the set of data represents a purchase, a transmission, a production, a sale, and/or a consumption of energy. At reference numeral 404, the system can facilitate execution (e.g., using execution component 120) of a set of contracts between a first subset of agent components and/or a second subset of agent components. At reference numeral 406, the system can validate (e.g., using validation component 210) the set of contracts based on whether a fulfillment of terms of the set of contracts maintains or exceeds a target stability threshold of an electric grid.

Figure 5:
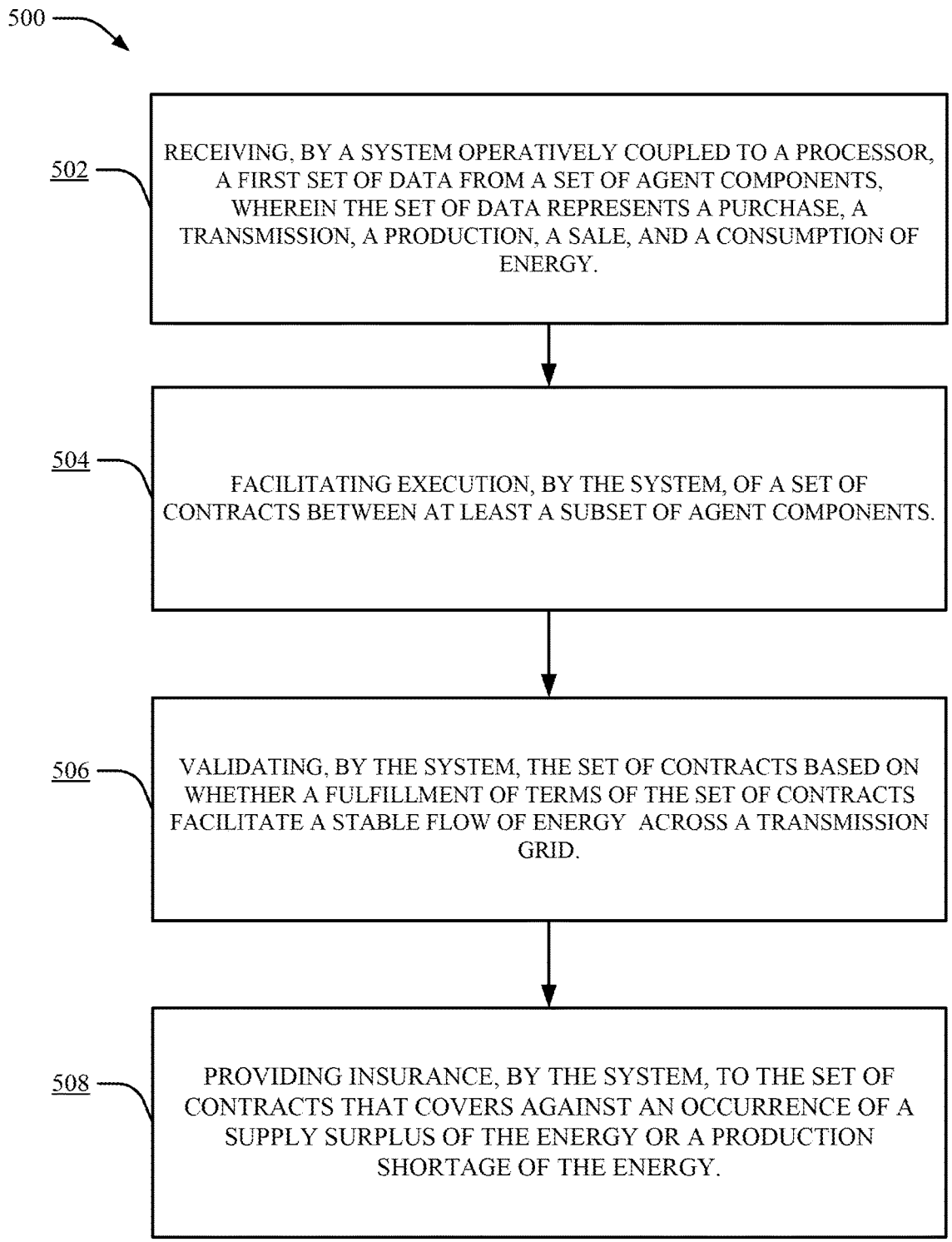
FIG. 5 illustrates a flow diagram of an example, non-limiting computer-implemented method that facilitates a providing of insurance to one or more contracts executed between a set of agent components of a system to facilitate one or more power transactions in accordance with one or more embodiments described herein.

FIG. 5 illustrates a flow diagram of an example, non-limiting computer-implemented method 500 that can facilitate a providing of insurance to one or more contracts executed between a set of agent components of a system to facilitate one or more power transactions in accordance with one or more embodiments described herein.

In an aspect, one or more of the components described in computer-implemented method 500 can be electrically and/or communicatively coupled to one or more devices. Repetitive description of like elements employed in other embodiments described herein is omitted for sake of brevity. In some implementations, at reference numeral 502, a system operatively coupled to a processor (e.g., processor 112) can receive (e.g., using interaction component 110) a first set of data from a set of agent components (e.g., consumer agent component 152, producer agent component 154, grid agent component 156, insurance agent component 158), wherein the set of data represents a purchase, a transmission, a production, a sale, and/or a consumption of energy.

At reference numeral 504, the system can facilitate execution (e.g., using execution component 120) of a set of contracts between a first subset of agent components and a second subset of agent components. At reference numeral 506, the system can validate (e.g., using validation component 210) the set of contracts based on whether a fulfillment of terms of the set of contracts maintains or exceeds a target stability threshold of an electric grid. At reference numeral 508, the system can insure (e.g., using insurance agent component 158) the set of contracts against a supply surplus of the energy of the energy or a production shortage of the energy.

Figure 6:
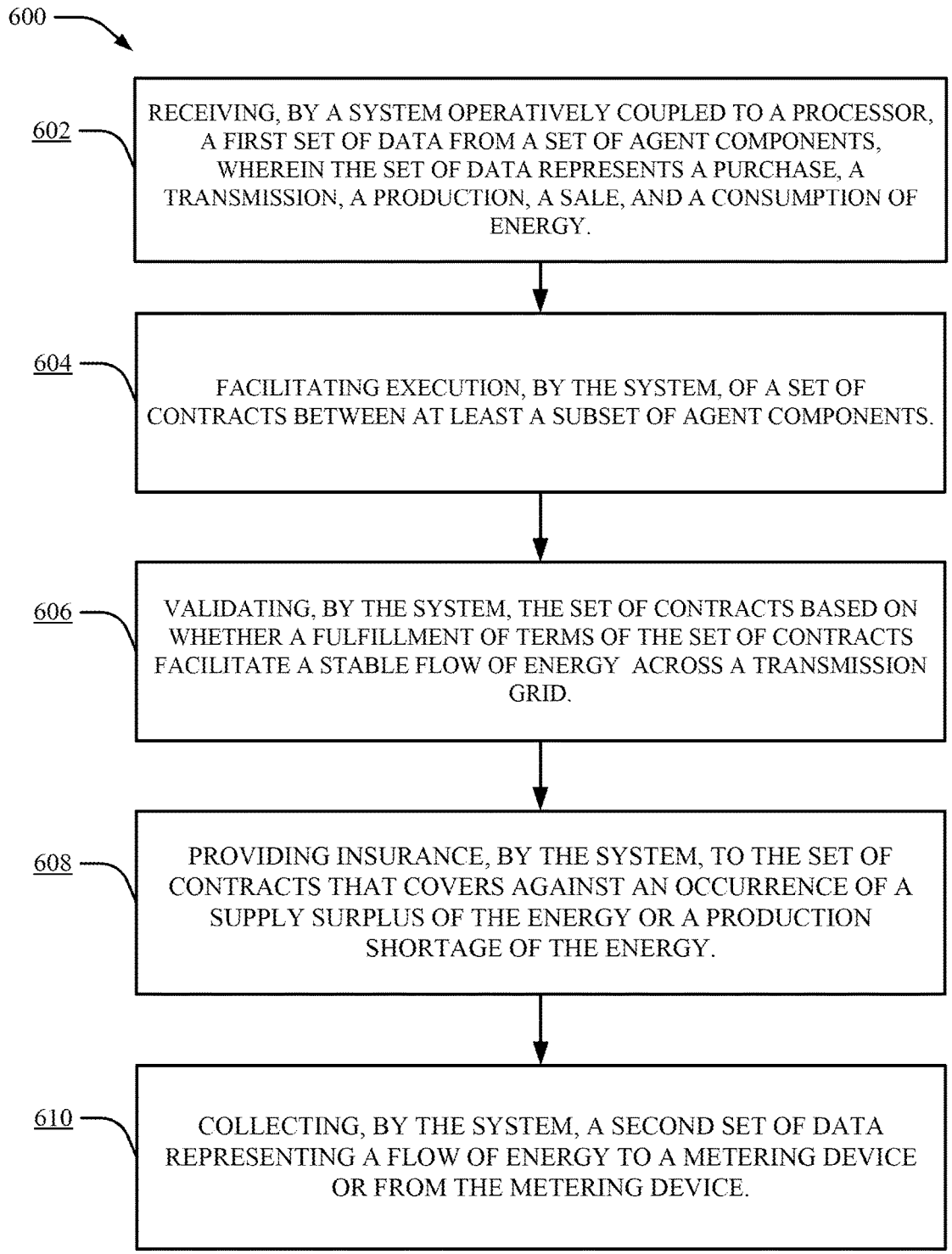
FIG. 6 illustrates a flow diagram of an example, non-limiting computer-implemented method that facilitates a collection of data corresponding to the performance of activities associated with one or more contract obligations of a system to facilitate one or more power transactions in accordance with one or more embodiments described herein.

FIG. 6 illustrates a flow diagram of an example, non-limiting computer-implemented method 600 that can facilitate a collection of data corresponding to the performance of activities associated with one or more contract obligations of a system to facilitate one or more power transactions in accordance with one or more embodiments described herein.

In an aspect, one or more of the components described in computer-implemented method 600 can be electrically and/or communicatively coupled to one or more devices. Repetitive description of like elements employed in other embodiments described herein is omitted for sake of brevity. In some implementations, at reference numeral 602, a system operatively coupled to a processor (e.g., processor 112) can receive (e.g., using interaction component 110) a first set of data from a set of agent components (e.g., consumer agent component 152, producer agent component 154, grid agent component 156, insurance agent component 158), wherein the set of data represents a purchase, a transmission, a production, a sale, and/or a consumption of energy.

At reference numeral 604, the system can facilitate execution (e.g., using execution component 120) of a set of contracts between a first subset of agent components and/or a second subset of agent components. At reference numeral 606, the system can validate (e.g., using validation component 210) the set of contracts based on whether a fulfillment of terms of the set of contracts maintains or exceeds a target stability threshold of an electric grid. At reference numeral 608, the system can insure (e.g., using insurance agent component 158) the set of contracts against a supply surplus of the energy of the energy or a production shortage of the energy. At reference numeral 610, the system can collect (e.g., using monitoring component 220 in connection with one or more smart meter components) a second set of data representing a flow of electricity provided by a metering device.

Figure 7:
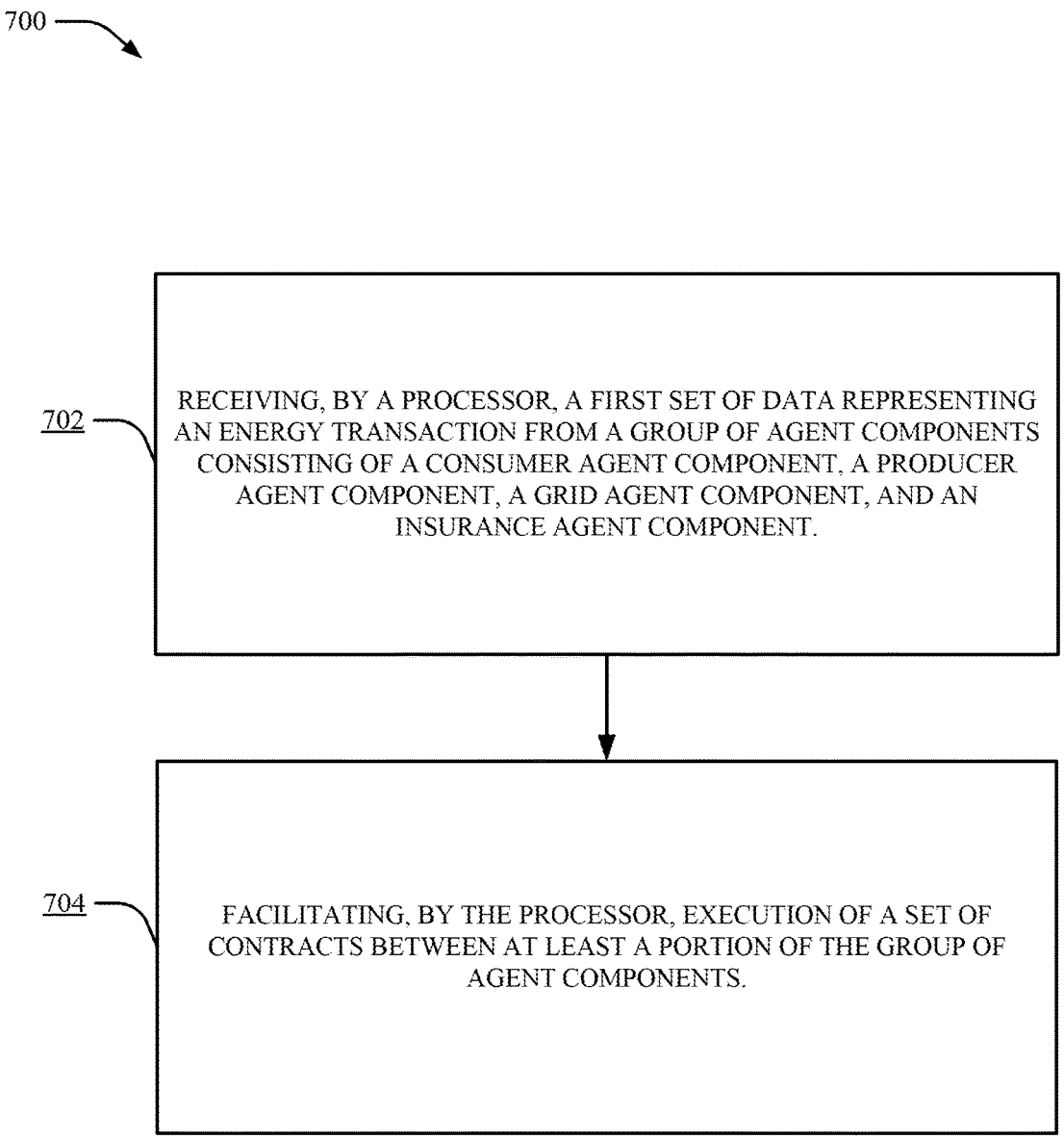
FIG. 7 illustrates a flow diagram of an example, non-limiting computer program product that causes a processor to receive data from a group of agent components and execute one or more contracts based on the received data to facilitate one or more power transactions in accordance with one or more embodiments described herein.

FIG. 7 illustrates a flow diagram of an example non-limiting computer program product 700 that causes a processor (e.g., processor 112) to receive data from a group of agent components and/or execute one or more contracts based on the received data to facilitate one or more power transactions in accordance with one or more embodiments described herein.

In an aspect, one or more of the components described in computer program product 700 can be electrically and/or communicatively coupled to one or more devices. Repetitive description of like elements employed in other embodiments described herein is omitted for sake of brevity. In step 702, the program instructions of computer program product 700 cause the processor (e.g., processor 112) to receive (e.g., using interaction component 110) a first set of data from a group of agent components consisting of a consumer agent component, a producer agent component, a grid agent component, and/or an insurance agent component. In step 704, the program instructions of computer program product 700 cause the processor to facilitate execution (e.g., using execution component 120) of a set of contracts between at least a portion of the group of agent components.

Figure 8:
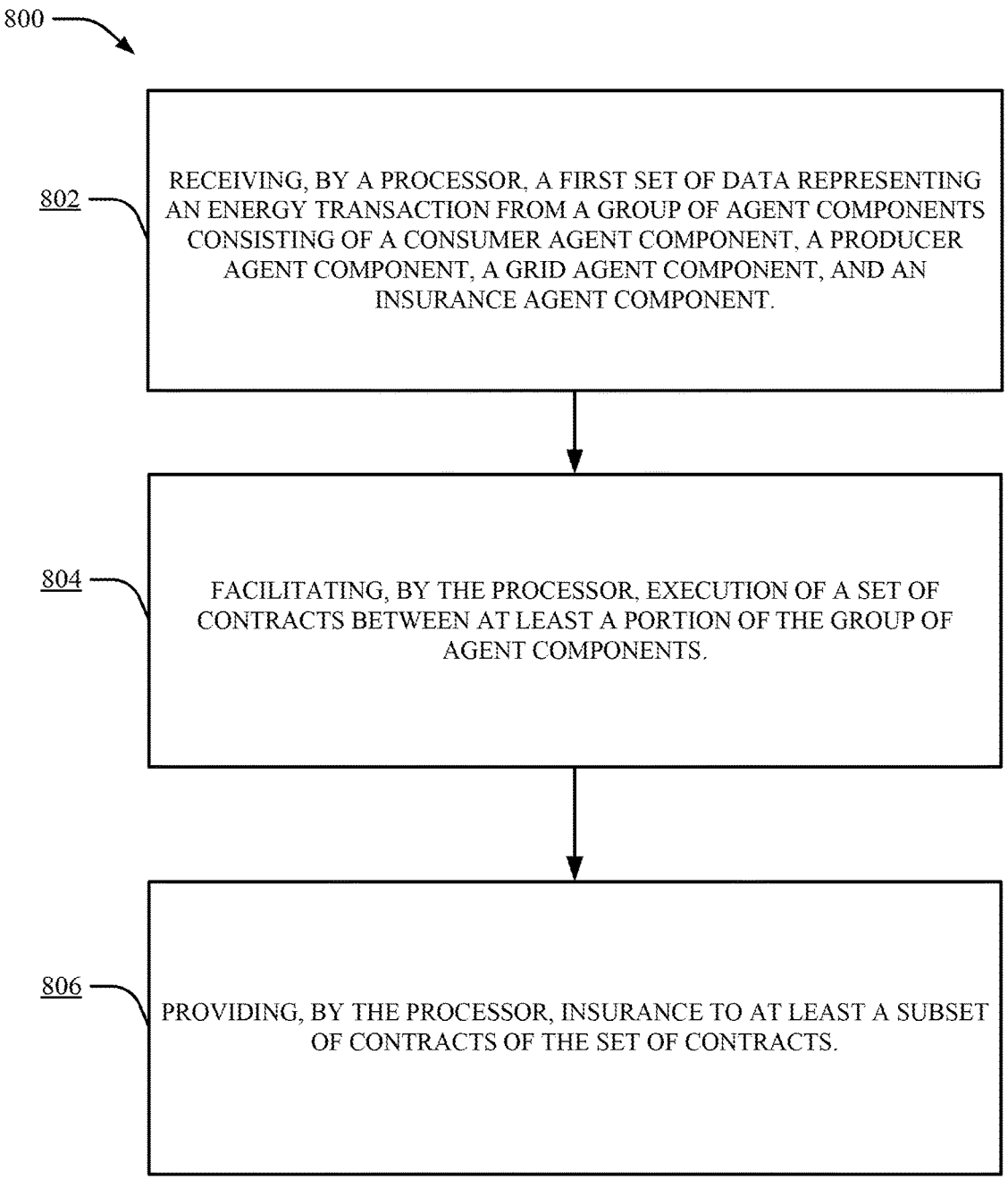
FIG. 8 illustrates a flow diagram of an example, non-limiting computer program product that causes a processor to provide insurance to one or more contracts between a group of agent components to facilitate one or more power transactions in accordance with one or more embodiments described herein.

FIG. 8 illustrates a flow diagram of a non-limiting example computer program product 800 that causes a processor (e.g., processor 112) to provide insurance to one or more contracts between a group of agent components to facilitate one or more power transactions in accordance with one or more embodiments described herein.

In an aspect, one or more of the components described in computer program product 800 can be electrically and/or communicatively coupled to one or more devices. Repetitive description of like elements employed in other embodiments described herein is omitted for sake of brevity. In step 802, the program instructions of a computer program product 800 cause the processor (e.g., processor 112) to receive (e.g., using interaction component 110) a first set of data from a group of agent components consisting of a consumer agent component, a producer agent component, a grid agent component, and/or an insurance agent component. In step 804, the program instructions of a computer program product 800 cause the processor to facilitate execution (e.g., using execution component 120) of a set of contracts between at least a portion of the group of agent components. In step 806, the program instructions of a computer program product 800 cause the processor to provide insurance (e.g., using insurance agent component 158) to at least a subset of contracts of the set of contracts.

Figure 9:
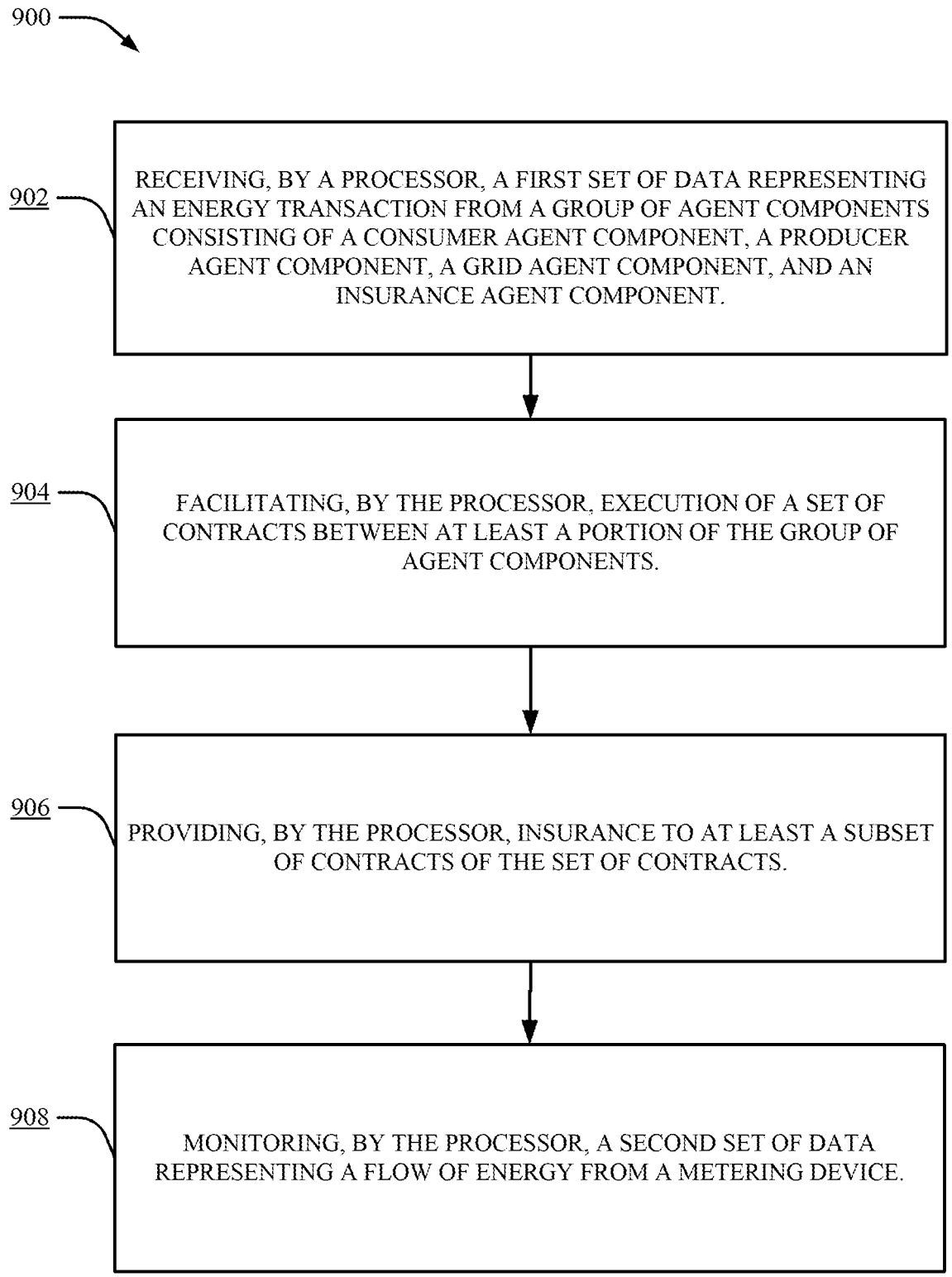
FIG. 9 illustrates a flow diagram of an example, non-limiting computer program product that causes a processor to monitor data representing a flow of energy from a metering device to facilitate one or more power transactions in accordance with one or more embodiments described herein.

FIG. 9 illustrates a flow diagram of a non-limiting example computer program product 900 that causes a processor (e.g., processor 112) to monitor data representing a flow of energy from a metering device to facilitate one or more power transactions in accordance with one or more embodiments described herein.

In an aspect, one or more of the components described in computer program product 900 can be electrically and/or communicatively coupled to one or more devices. Repetitive description of like elements employed in other embodiments described herein is omitted for sake of brevity. In step 902, the program instructions of a computer program product 900 cause the processor (e.g., processor 112) to receive (e.g., using interaction component 110) a first set of data from a group of agent components consisting of a consumer agent component, a producer agent component, a grid agent component, and/or an insurance agent component. In step 904, the program instructions of a computer program product 900 cause the processor to facilitate execution (e.g., using execution component 120) of a set of contracts between at least a portion of the group of agent components. In step 906, the program instructions of a computer program product 900 cause the processor to provide insurance (e.g., using insurance agent component 158) to at least a subset of contracts of the set of contracts. In step 908, the program instructions of a computer program product 900 cause the processor to monitor (e.g., using a monitoring component 220 in connection with one or more smart meter components) a second set of data representing a flow of electricity from a metering device.

For simplicity of explanation, the computer-implemented methodologies and computer program products are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because an interaction between a set of agent components capable of accessing historical, statistical, and predictive data to facilitate an execution of contracts between a wide range of parties to a energy transaction in an optimally efficient marketplace for all parties is performed by components executed by a processor (e.g., processor 112) established from a combination of electrical and mechanical components and circuitry, a human is unable to replicate or perform the subject data packet configuration and/or the subject communication between processing components, an interaction component and/or an execution component. Furthermore, predictive supply and demand data, historical use and behavior data, and historic as well as predictive pricing data associated with energy transactions facilitated by the power transaction system can be generated, transformed, accessed and utilized by agent components to select optimal contract arrangements for parties to an energy transaction. The access to such predictive data is accessed from a memory (e.g., using memory 108) in accordance with access patterns that cannot be replicated by a human.

Also, the systems and methods disclosed herein can be integrated with the tangible and physical electronic grid infrastructure components at one or more localities. In another aspect the systems and methods disclosed can be integrated with physical devices such as smart meter devices, tablets, desktop computers, mobile devices, and other such hardware. Furthermore, the ability of facilitating energy transactions between agent components that facilitate create an efficient energy market that stabilizes an electric grid using system components, renders intermediary transaction components unnecessary, provides equal access to independent and establishment energy provider devices, and integrates conventional and advanced energy generation devices through a single power transaction system cannot be performed by a human. For example, a human is unable to integrate smart meter technologies, payment technologies, data monitoring technologies, electric grid technologies, and agent component technologies to execute thousands of energy transactions simultaneously in an efficient and accurate manner. Furthermore, a human is unable to simultaneously access and employ energy flow data, payment data, historical trend data, predictive economic data, artificial intelligence generated economic forecast data and/or packetized data for communication between a main processor (e.g., using processor 112) and a memory (e.g., memory 108) to simultaneously facilitate thousands of energy transactions.

Figure 10:
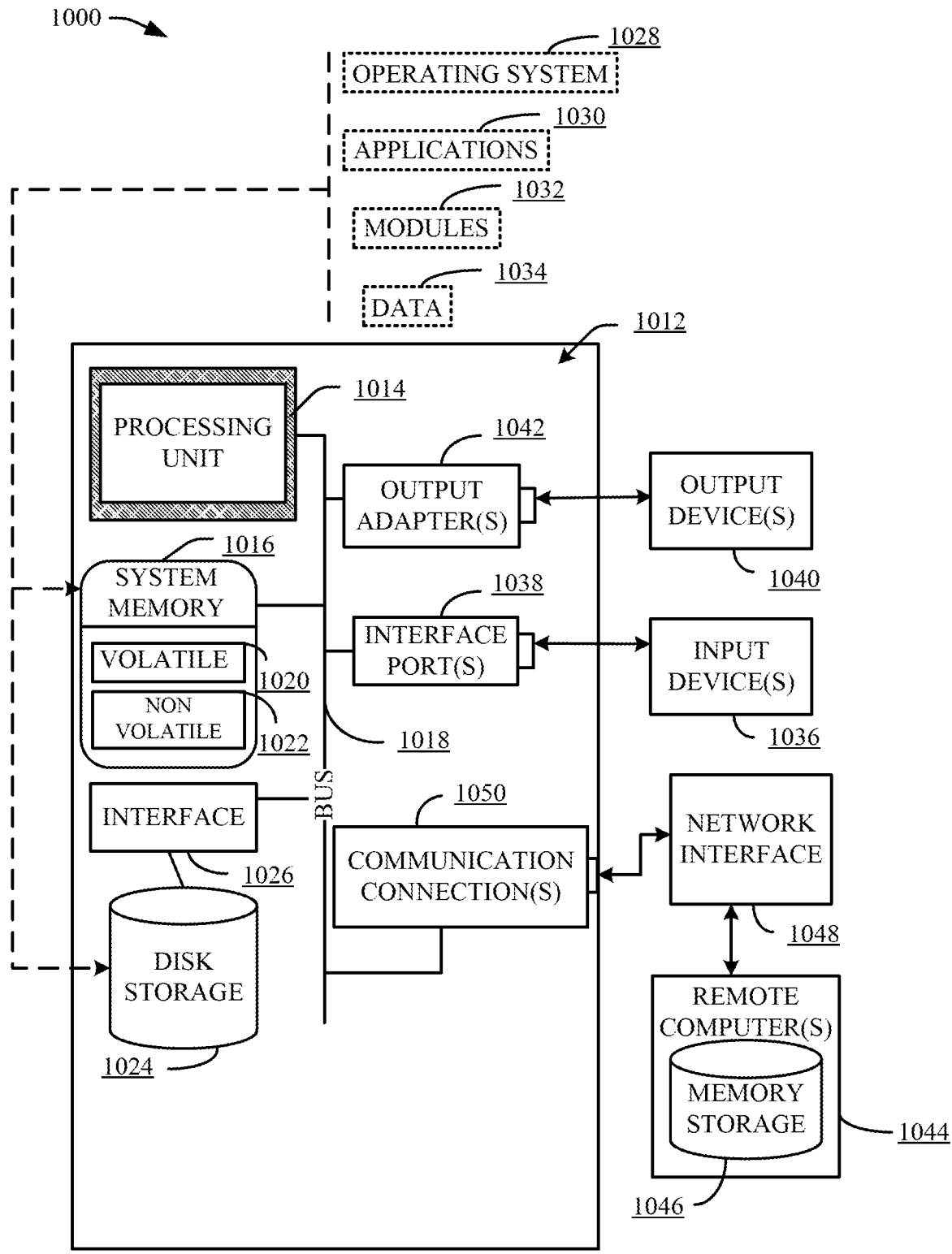
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a general description of a suitable environment in which the various aspects of the disclosed subject matter can be implemented. FIG. 10 illustrates a block diagram of an example, non-limiting operating environment in which one or more embodiments described herein can be facilitated. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1242 is provided to illustrate that there are some output device 1040 like monitors, speakers, and printers, among other such output device 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A power transaction system, comprising:
a memory that stores computer executable components;
a processor that executes the computer executable components stored in the memory, wherein the computer executable components comprise:
an interaction component that receives, via the system, first information from a set of agent components regarding purchase, generation, sale or provisioning of energy by one or more devices via an electricity grid;
an execution component that facilitates:
execution of contracts between a subset of the set of agent components based on the first information and an inference of future energy usage, wherein the inference is determined by the system based on artificial intelligence performed by the system, and wherein the facilitating execution improves the efficiency of the process of transporting electricity; and
facilitates performance of an outlay of energy based on the execution and the inference;
a configuration component that performs enhanced data processing operations and value-add operations comprising facilitating a prediction of future electricity demands, accessing archived data and accessing collected data on the flow of electricity via the electricity grid;
a monitoring component that collects data regarding flow of electricity from a metering component, wherein the data is selected from a group comprising time stamps, member identification and energy consumption; and
billing component that utilizes second information from a validation component and the monitoring component to determine fulfillment of the contracts and transfer of money between the one or more devices based on a comparison of the data to a set of requirements of the contracts;
consumer agent component that accesses the information generated and collected by the configuration component, and employs artificial intelligence via a specialized computer and utilizing historical data, statistics and trends to predict within a defined level of confidence a demand for energy at a future date or time; and
a consumer member system that transmits the electricity across the electricity grid, wherein the power transaction system controls the deployment of electricity in a manner that minimizes or eliminates a need for excess storaqe capacity on the electricity grid and flow of electricity between the electricity grid and a consumer smart meter component of the power transaction system based on the artificial intelligence and corresponding prediction of at least one of the demand for energy at the future date or time.

2. The power transaction system of claim 1, further comprising an insurance agent component that determines whether to provide an insurance guarantee to the one or more devices of the contracts.

3. The power transaction system of claim 1, further comprising a validation component that validates at least one of the contracts.

4. The power transaction system of claim 1, further comprising an archiving component that archives details associated with at least one of power transaction events corresponding to the contracts, one or more money transfer activities between the one or more devices or collected data regarding flow of electricity from a metering component.

5. The power transaction system of claim 1, further comprising a producer agent component that estimates future production of electricity corresponding to the one or more devices.

6. The power transaction system of claim 5, wherein the producer agent component employs artificial intelligence to infer the future production of electricity from a second set of recurrently updated data corresponding to the interaction component and electricity supply criteria.

7. The power transaction system of claim 1, further comprising a pricing component that sets energy prices as a function of energy supply and demand for at least one of the purchase, the generation, the sale or the provisioning of energy.

8. The power transaction system of claim 1, further comprising:
a resale component that determines portions of the contracts for assignment to third party producers to facilitate fulfillment of the contracts;
the interaction component further ranks one or more candidate contracts eligible for the execution based on a user preference, a ranking preference by the subset of agent components, or a policy; and
an executive agent component that selects the contracts for the execution from one or more ranked candidate contracts based on a ranking by the interaction component.

9. A computer program product of a power transaction system for facilitating a power transaction between a set of agent components corresponding to one or more devices, the computer program product comprising a computer readable storage medium having program instructions embodied therewith, the program instructions executable by a processor to cause the processor to:

receive, by a device, a first set of data from a group of agent components, wherein the group of agent components comprises at least one of a consumer agent component, a producer agent component, a grid agent component or an insurance agent component;

facilitate execution of a set of contracts between at least a portion of the group of agent components based on the first set of data and an inference of future energy usage on an electricity grid, wherein the inference is determined by the device based on artificial intelligence performed by the device, and wherein the facilitating execution improves the efficiency of the process of transporting electricity;

facilitate performance of an energy activity based on the execution and the inference;

perform, by the device, enhanced data processing operations and value-add operations comprising facilitating a prediction of future electricity demands, accessing archived data and accessing collected data on the flow of electricity via the electricity grid;

access, by the device, the information generated and collected;

employ, by the device, artificial intelligence via a specialized computer and utilize historical data, statistics and trends to predict within a defined level of confidence a demand for energy at a future date or time;

collect, by the device, data regarding flow of electricity from a metering component, wherein the data is selected from a group comprising time stamps, member identification and energy consumption;

utilize, by the device, second information from a validation component and the monitoring component to determine fulfillment of the contracts and transfer of money between the one or more devices based on a comparison of the data to a set of requirements of the contracts; and transmit, by the device, the electricity across the electricity grid based on a control of the deployment of electricity in a manner that minimizes or eliminates a need for excess storage capacity on the electricity grid and flow of electricity between the electricity grid and a consumer smart meter component of the power transaction system based on the artificial intelligence and corresponding prediction of at least one of the demand for energy at the future date or time.

10. The computer program product of claim 9, wherein the program instructions are further executable by the processor to cause the processor to: provide insurance to at least a subset of contracts of the set of contracts.

11. The computer program product of claim 9, wherein the program instructions are further executable by the processor to cause the processor to: monitor a second set of data representing a flow of electricity from a metering device.

* * * * *